(12) United States Patent
Perrelle

(10) Patent No.: US 11,466,894 B1
(45) Date of Patent: Oct. 11, 2022

(54) COMPACT ORIENTATION-ADJUSTABLE MISTER-FAN APPARATUS

(71) Applicant: Tyler Perrelle, Mahopac, NY (US)

(72) Inventor: Tyler Perrelle, Mahopac, NY (US)

( * ) Notice: Subject to any disclaimer, the term of this patent is extended or adjusted under 35 U.S.C. 154(b) by 0 days.

(21) Appl. No.: 17/692,278

(22) Filed: Mar. 11, 2022

Related U.S. Application Data

(60) Provisional application No. 63/230,654, filed on Aug. 6, 2021.

(51) Int. Cl.
| | |
|---|---|
| *F24F 13/32* | (2006.01) |
| *F16M 13/02* | (2006.01) |
| *F24F 13/20* | (2006.01) |
| *F24F 6/16* | (2006.01) |
| *F24F 6/00* | (2006.01) |

(52) U.S. Cl.
CPC ........... *F24F 13/32* (2013.01); *F16M 13/022* (2013.01); *F24F 6/16* (2013.01); *F24F 13/20* (2013.01); *F24F 2006/008* (2013.01)

(58) Field of Classification Search
CPC combination set(s) only.
See application file for complete search history.

(56) References Cited

U.S. PATENT DOCUMENTS

| | | | |
|---|---|---|---|
| 4,839,106 A | 6/1989 | Steiner | |
| 4,850,804 A * | 7/1989 | Huang | F16M 13/022 416/246 |
| 5,338,495 A | 8/1994 | Steiner et al. | |

(Continued)

FOREIGN PATENT DOCUMENTS

| | | |
|---|---|---|
| CA | 2708754 | 1/2011 |
| EP | 0403517 | 11/1994 |

(Continued)

OTHER PUBLICATIONS

CAVN_stroller_fan_clip_on, 27 pages, [retrieved on Feb. 24, 2021], Retrieved from the Internet <URL: https://www.amazon.com/CAVN-Stroller-Rechargeable-Operated-Oscillating/dp/B07PVRHBMX/ref=fr_1_3?dchld=1&keywords=oscillating+usb+fan&qid=1614209974&sr=8-3>.

(Continued)

*Primary Examiner* — Monica E Millner
(74) *Attorney, Agent, or Firm* — Law Office of David J. Rosenblum; David J. Rosenblum

(57) ABSTRACT

A mister-fan apparatus includes: a housing having a fan end and a reservoir end; at the fan end, a fan unit; at the reservoir end, a reservoir; a motor; a pump; an inlet conduit from the reservoir to the pump; and an outlet conduit from the pump to the fan unit, collectively configured for, through the use of the inlet and outlet conduits, pumping fluid from the reservoir to the fan unit so that the fan can output mist; a track peripherally surrounding the housing at least partway around; an attaching device having an attaching end and an extension end; a tongue having a track end, and a connection end connected to the extension end; and, within the track, a retaining slider connected to the track end; wherein the attaching end is configured for removably attaching to an external structure for supporting the apparatus. The track may include a pair of ridges, rigidly connected to the housing, that extend initially outwardly from the housing, and later toward each other but only to an extent of leaving a separation serving as a slot.

20 Claims, 9 Drawing Sheets

(56) References Cited

U.S. PATENT DOCUMENTS

| | | | |
|---|---|---|---|
| 5,843,344 A | 12/1998 | Junkel et al. | |
| 5,967,415 A | 10/1999 | Utter | |
| 6,216,961 B1 | 4/2001 | Utter et al. | |
| 6,222,734 B1 | 4/2001 | Bookhardt et al. | |
| 6,272,874 B1 | 8/2001 | Keeney | |
| 6,398,132 B1 | 6/2002 | Junkel et al. | |
| 6,543,247 B2 | 4/2003 | Strauss | |
| 6,764,248 B1* | 7/2004 | Hsu | F24F 5/0035 417/313 |
| 6,827,290 B2* | 12/2004 | Zimmerman | B05B 15/62 239/289 |
| 7,249,779 B2 | 7/2007 | Ehrenreich et al. | |
| 7,566,048 B1 | 7/2009 | Ptak | |
| 7,645,285 B2 | 1/2010 | Cosgrove et al. | |
| 7,850,513 B1 | 12/2010 | Parker et al. | |
| 8,182,226 B2 | 5/2012 | Fu | |
| 8,297,695 B1 | 10/2012 | Aiken et al. | |
| 8,409,234 B2 | 4/2013 | Stahler et al. | |
| 8,678,781 B2 | 3/2014 | Imagawa et al. | |
| 8,727,819 B2 | 5/2014 | Giefers et al. | |
| 8,864,799 B2 | 10/2014 | Kraus | |
| 10,408,344 B2 | 9/2019 | Ma et al. | |
| 10,570,920 B2* | 2/2020 | Lee | F04D 25/08 |
| 2002/0148909 A1 | 10/2002 | Junkel et al. | |
| 2009/0129913 A1 | 5/2009 | Schutte et al. | |
| 2009/0308382 A1 | 12/2009 | Jin | |
| 2009/0314216 A1 | 12/2009 | Polak | |
| 2012/0207587 A1 | 8/2012 | Morgan | |
| 2012/0319308 A1 | 12/2012 | Chen et al. | |
| 2013/0175714 A1 | 7/2013 | Altman et al. | |
| 2013/0219933 A1 | 8/2013 | Hubert et al. | |
| 2014/0112791 A1* | 4/2014 | Abell | F04D 25/084 416/159 |
| 2014/0205479 A1 | 7/2014 | Wark | |
| 2015/0159938 A1 | 6/2015 | Weckerly | |
| 2016/0326765 A1 | 11/2016 | Barbret | |
| 2017/0036231 A1* | 2/2017 | Conway | B05B 11/3045 |
| 2017/0045246 A1 | 2/2017 | Kaleta et al. | |
| 2018/0266714 A1 | 9/2018 | Perrelle | |
| 2020/0300531 A1 | 9/2020 | Barlettano | |
| 2020/0375366 A1 | 12/2020 | Chen | |

FOREIGN PATENT DOCUMENTS

| | | |
|---|---|---|
| JP | 2007289911 A | 11/2007 |
| KR | 20180039617 | 4/2018 |
| KR | 102120801 | 6/2020 |
| WO | 2013016227 | 1/2013 |

OTHER PUBLICATIONS

Glovion_clip_on_fan, 2 pages, [retrieved on Jun. 7, 2021]. Retrieved from the Internet <URL: https://www.amazon.com/Stroller-Operated-Emergency-Rechargeable-Office-Navy/dp/B07QRN5ZY9/ref=asc_df_B07QRN5ZY9?tag=bingshoppinga-20&linkCode=df0&hvadid=79852084654381&hvnetw=o&hvqmt=e&hvbmt=be&hvdev=c&hvlocint=&hvlocphy=&hvtargid=pla-4583451671848456&psc=1 >.

SunnyTech_Mini_Small_Solar_Panel, 1 page, [retrieved on Mar. 4, 2021] Retrieved from the Internet <URL: https://www.amazon.com/Sunnytech-100ma-Module-Polysilicon-Charger/dp/8008J9BZIA>.

WayinTop_3pcs_mini_water_pump, 2 pages, [retrieved on Feb. 25, 2021]. Retrieved from the Internet <URL: https://www.amazon.com/WayinTop-Submersible-Flexible-Fountain-Aquarium/dp/B07TMW5CDM/ref=sr_1_6?dchild=1&keywords=micro+pump&qid=1614261785&sr=8-6>.

Small_brass_telescopic_tubing, 2 pages, [retrieved on Mar. 1, 2021]. Retrieved from the Internet <URL: https://www.homedepot.com/p/Small-Brass-Telescopic-Tubing-3400/312254390>.

* cited by examiner

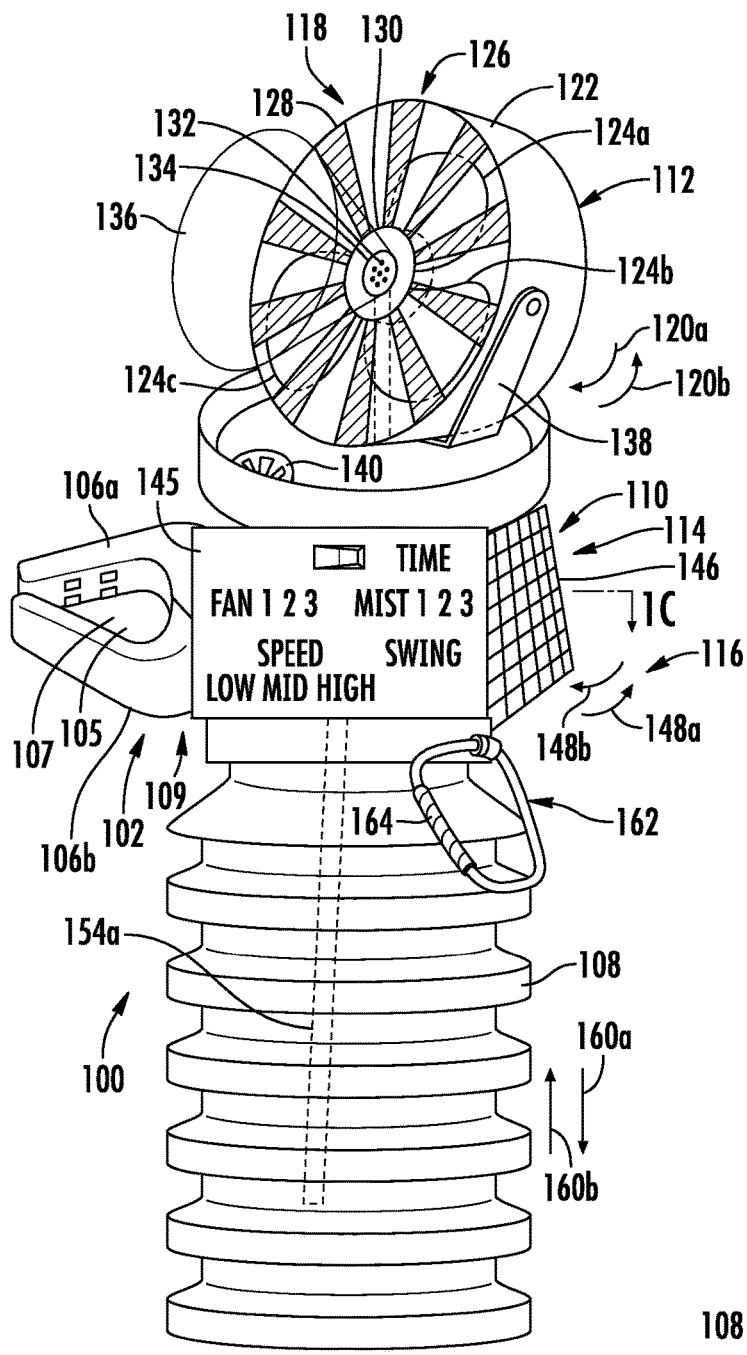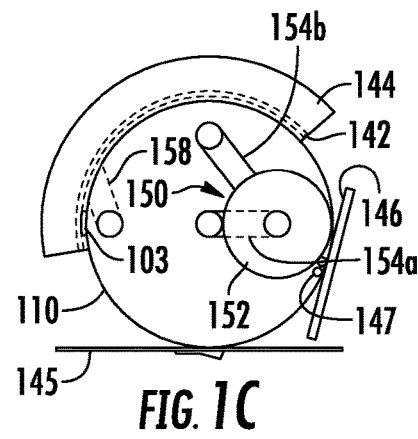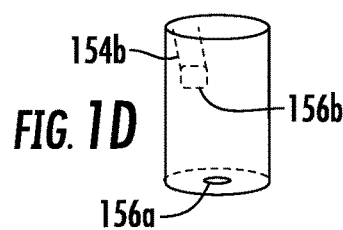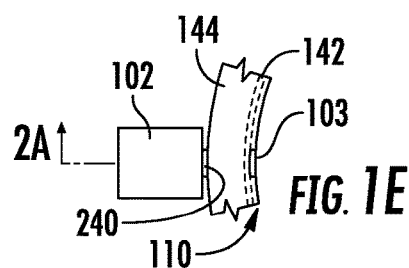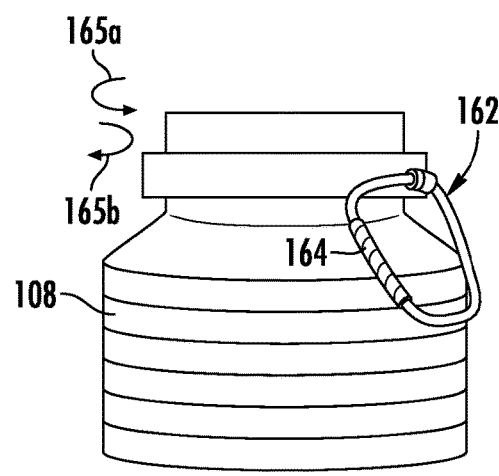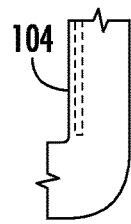

COMPACT ORIENTATION-ADJUSTABLE MISTER-FAN APPARATUS

FIELD OF THE INVENTION

The present invention pertains to the field of cooling mist sprayers and fans, and more specifically to the field of cooling mist sprayers and fans designed to removably attach onto a supporting structure.

BACKGROUND OF THE INVENTION

Consider, for example, the need that virtually all of us have for feeling the sunlight on our skin. Our need for the sun on our skin is not only physiological, in terms of synthesizing Vitamin D, but also psychological and emotional and as long as we do not overdo it, we just plain feel better, psychologically, emotionally, physically, and in terms of our appearance, when we have taken the time to soak up some rays. Great as it is, though, reclining on a lounge-chair, hiking, or bicycle riding in the summer sun is also hot, so hot that we need, from time to time, a way to cool ourselves off.

Portable misting fans are popular for providing relief from the sun on a hot day. The mist delivered to the user is accompanied by blowing of air that enhances the evaporation on the user's skin, thereby cooling the skin. Even the blowing of air itself on the user's skin aids in the evaporation of any perspiration or condensed mist.

U.S. Patent Publication No. US 2013/0175714 to Altman et al. ("Altman") provides at the top of a portable misting fan device an oscillating fan, pump, motor (which may be for both the pump and the fan), and nozzle that oscillate as a single unit. The pump switch may be electronic or mechanical; if electronically activated, it may be automatically operated so as to provide intermittent periods of misting. Altman needs access to a body of water, such as a lake, as a source of the moisture for creating the mist. The device is designed to be clamped to a horizontal structure, like a table top on a boat for example. Directionality of the fan output is adjustable through upstanding arms that are coupled end-to-end to provide underlying support for the fan/pump/motor/nozzle unit. The clamp provides underlying support for the arms and therefore the unit as well. Each arm is rotatable in a prescribed orientation by loosening its knob which can then be tightened after rotating the arm into position. The rotations are limited by the need to avoid pivoting detachment of the device which could occur if the device weight is too far displaced from over the underlying clamp's hold onto the horizontal structure. The jaws as depicted afford limited holding power onto thicker supporting structures. Since the clamp jaws are opened by squeezing together the handles behind the fulcrum, the clamp is long. The clamp and the arms make the device less compact. Because the device depends on a nearby body of water, less of a need exists for the device to be portable and compact.

U.S. Pat. No. 4,839,106 to Steiner features a portable misting fan which is in a self-contained unit and has an elongated configuration in order to accommodate the narrow inner chamber serving as a fluid reservoir. The device has an extended neck portion with a fan positioned at the top end along with an atomizing head. The user squeezes a vacuum bulb to draw fluid up from the inner chamber into the atomizing head. As with the Altman device, the outflowing mist mixes with the air blown out by the fan. A clamping member can be plunged into the ground to anchor the device. Or it can be slipped down along a vertical structure to thereby secure the device. No clamping to a horizontal structure is provided. The extended neck is rigid but can be flexed into a desired orientation to direct the fan accordingly.

U.S. Pat. No. 5,338,495 to Steiner et al. discloses a compact, handheld misting fan with its own fluid reservoir. Because the device is handheld, it can be pointed in any direction. There is, however, no facility for attaching it to a beach chair, golf cart, boat, bicycle, rock-climber's backpack frame, etc.

U.S. Patent Publication No. US 2018/0266714 to Perrelle is directed to a portable misting fan apparatus which is attachable to horizontal structures or surfaces. It has, for this purpose, a small clip for which the jaws can be opened by squeezing down a handle disposed behind the fulcrum. It also has a fluid reservoir that is collapsible for reducing the form factor of the apparatus. The apparatus includes a neck portion that is long and easily manipulated to point the fan in the desired direction. However, the neck, and especially its length, exposes the device to inadvertent contact and possible damage, increases the perimeter within which activity is restricted in avoiding interference with the device, and makes the device less easily portable.

SUMMARY OF THE INVENTION

The present invention is directed to addressing one or more of the above concerns.

Ideally, when we are stretched out soaking up the sun, wherever we currently are, there would be a way to cool ourselves off without having to get up to do it. We might be in continuous travel, as on a bicycle. A versatile, automatic cooling means is needed.

An object in accordance with aspects of the invention is to provide a compact and portable misting-fan apparatus that the user can securely affix, for use, to a nearby structure of arbitrary orientation.

Relatedly, an object in accordance with aspects of the present invention is for the apparatus to, for compactness and sturdiness, include a clamp having mutually opposing clamping-jaws that are biased to pivot toward each other at a fulcrum in order to pivot shut at which point the mutually opposing clamping-jaws are closer to each other distally than proximally. The clamping-jaws are designed for being directly manually pried apart, thereby foregoing the need for handles behind the fulcrum and the extra length they would entail.

Another object in accordance with aspects of the present invention is for the attachment to be securely made to cylindrical structures as well as flat structures.

A further object in accordance with aspects of the present invention is for the apparatus to be, for any given orientation of the external structure at the site of the attachment, widely adjustable as to the direction of air/mist outflow.

Yet another object in accordance with aspects of the present invention is for the apparatus to include a solar panel that is adjustably tiltable to increase sun exposure on the panel.

A still further object in accordance with aspects of the present invention is for the device to include, for times when it is not in use, a carabiner for, by means of, for example, a backpack, bicycle, or boat, securely storing the device or securely transporting the device.

In accordance with what is proposed herein, a mister-fan apparatus includes a housing having a fan end and a reservoir end. The apparatus further includes, at the fan end, a fan unit and, at the reservoir end, a reservoir. A pump assembly of the apparatus includes a motor, a pump, an inlet conduit from the reservoir to the pump, and an outlet conduit from the pump to the fan unit. The pump assembly is configured for, through the use of the inlet and outlet conduits, pumping fluid from the reservoir to the fan unit so that the fan can output mist. The apparatus further includes a track peripherally surrounding the housing at least partway around. It also includes an attaching device having an attaching end and an extension end. The apparatus additionally includes a tongue having a track end, and a connection end connected to the extension end of the attaching device. Also included is a retaining slider within the track. The retaining slider is connected to the tongue at the track end. The attaching end of the attaching device is configured for removably attaching to an external structure for supporting the mister-fan apparatus. The apparatus is compact and yet, when anchored to a support of arbitrary fixed orientation, widely adjustable as to orientation of mist outflow and solar panel direction.

In a sub-aspect of what is proposed herein, the track includes a pair of ridges rigidly connected to the housing. The ridges extend initially outwardly from the housing, and subsequently toward each other but only to an extent of leaving a separation serving as a slot.

In a further sub-aspect, the retaining slider is wider than the slot to retain the retaining slider against pulling force exerted by the tongue.

In a different aspect, the retaining slider is shaped and dimensioned for sliding along the track in adjusting an orientation of the housing with respect to the external structure.

In a related aspect, the track is configured such that the retaining slider is slidable along the track over a range of at least 90 degrees in adjusting an orientation of the housing with respect to the external structure.

In one aspect, the housing is cylindrical and axially extends between the fan end and the reservoir end. The track circumferentially follows a circular path along and around the cylinder.

In another aspect, the tongue is rigid, the attachment of the fan unit at the fan end is rigid, and the attachment of the reservoir at the reservoir end is rigid.

In yet another aspect, the tongue is rigidly connected to the retaining slider. The retaining slider is sized, shaped and sufficiently flexible for manual rotation in place within the track by virtue of manually rotating in place the tongue and thereby the retaining slider.

In one version, the attaching device comprises a clamp, wherein the clamp has mutually opposing clamping-jaws designed for gripping by pivoting toward each other.

In a sub-aspect, the mutually opposing clamping-jaws are biased to, from a fulcrum, pivot shut at which point the mutually opposing clamping-jaws are closer to each other distally than proximally.

In an alternative or supplemental sub-aspect, the clamp is designed with a clamping force small enough for both the attaching and the removing by manual force without the need for tools.

In a different or supplemental sub-aspect, the clamping-jaws have inside surfaces that approach one another as the jaws are clamped shut, and wherein, for grabbing the external structure, discrete pads of frictional material are mounted to the inside surfaces.

In another or supplemental aspect, the clamping-jaws are disposed and shaped to preserve a proximal separation between the clamping-jaws for manually pulling the clamping-jaws apart in preparation for the removable attaching to the external structure.

In yet another or supplemental aspect, the clamping-jaws pivot shut at a fulcrum, and are internally round near the fulcrum in order to circumferentially grab, for support, a cylindrical object.

In accordance with some designs, the attaching device includes a clamp and further includes a proximal joint configured so that the clamp is, while the tongue remains motionless, manually rotatable in place, a longitudinal direction of the tongue serving as an axis of rotation for the clamp.

In a particular sub-aspect, the proximal joint includes a pair of mutually opposing orientation-setting jaws, each mutually opposing orientation-setting jaw of the pair having a set of teeth; and wherein a jaw from among the pair of mutually opposing orientation-setting jaws is rotatable to specific orientations, with respect to the housing, at which the sets, when brought together, interlockingly mate because the teeth of one jaw fill spaces between teeth of the other jaw.

In one other sub-aspect, the proximal joint includes a spring for urging the orientation-setting jaws together for the mating into an orientation from among the specific orientations.

In some embodiments, the retaining slider is shaped to fit the track so as to be non-rotatable in place.

In certain embodiments, a solar panel is tiltable with respect to the housing.

In accordance with at least one embodiment, a friction fit of the retaining slider within the track exists for keeping the mister-fan apparatus rigidly in place at an orientation to which the housing is adjusted with respect to the external structure.

In some versions of the invention, the track serves as an inner track, wherein the mister-fan apparatus further comprises an outer track containing the inner track, and wherein the outer track is rigidly attached to the housing and supports the attaching device.

In accordance with aspects of the invention, the mister-fan apparatus offers users a compact, portable, and versatile personal cooling fan and mister. Various embodiments have the following features. The apparatus is designed to clamp onto a lounge-chair, wheelchair, golf cart, baby stroller, or other object and to cool and refresh the user through timed-interval applications of cool or misted air. Both the input direction of sunlight for power or recharging and the orientation of the mist, or dry air, outflow are widely and easily user-adjustable, no matter what the orientation of the structure the apparatus clips onto. The clamp can securely attach the apparatus to the structure, whether flat or cylindrical. Although it serves as a "personal" device, it can be used for a group of people especially when implemented with an oscillating fan or a 360-degree rotating fan.

Details of the innovative versatile and compact personal cooling system are set forth further below, with the aid of the drawings, which are not drawn to scale.

BRIEF DESCRIPTION OF THE DRAWINGS

FIG. 1A is a perspective view of an exemplary mister-fan apparatus is accordance with what is proposed herein;

FIG. 1B depicts an exemplary external structure for supporting the apparatus of FIG. 1A;

FIG. 1C is a top sectional view of an exemplary housing, inner track, and outer track for the apparatus of FIG. 1A, as seen from just above the outer track;

FIG. 1D is a perspective view of an exemplary integrated pump and motor of the apparatus of FIG. 1A;

FIG. 1E is a top view of an exemplary attaching device for the apparatus of FIG. 1A, including the device's clamp, and including part of the device's proximal joint for connecting to the tracks of FIG. 1C;

FIG. 1F is a side view of an exemplary reservoir for the apparatus of FIG. 1A in a collapsed state;

DETAILED DESCRIPTION OF EMBODIMENTS

Figure 2A:
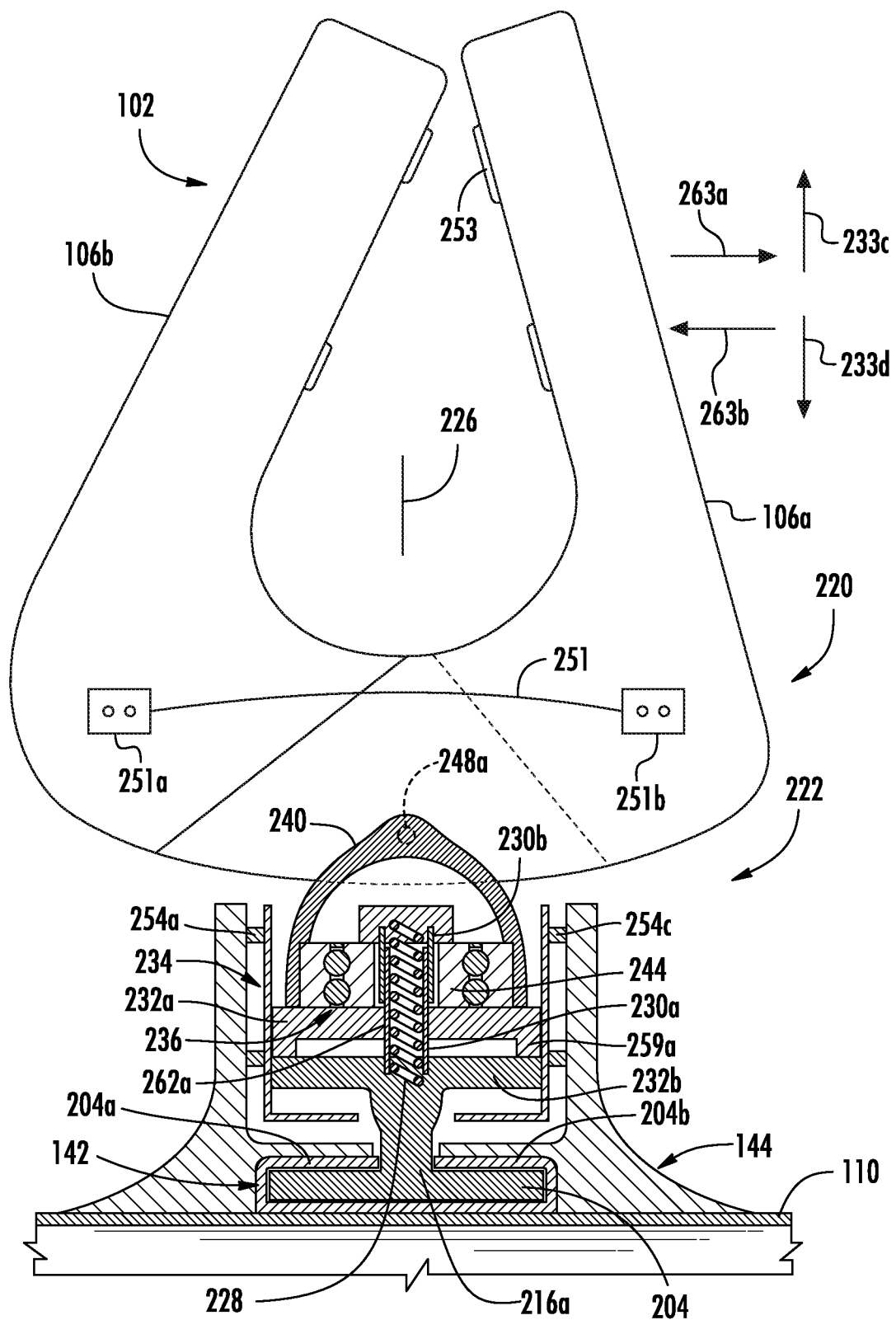
FIG. 2A is a side sectional view of the exemplary attaching device of FIG. 1E and its connections to the inner and outer tracks.

With reference to FIGS. 1A and 1B, an exemplary mister-fan apparatus 100 includes a clamp 102 which can be clamped onto an external structure 104. The structure 104 could be cylindrical, as seen in FIG. 1B. A rear portion of an opening 105 in the clamp 102 is likewise round so as to accommodate the cylindrical shape. Yet, mutually-opposing pivoting clamping-jaws 106a, 106b can grip a flat structure having any thickness within a given range, for example one-half inch to two inches. Beyond the mere clamping/unclamping motion, the clamp 102 is rotatable with two degrees of freedom, as will be described further herein below.

The instant mister-fan apparatus 100 has three main sections: A fluid-containable reservoir 108, a housing 110 and its contents, and a fan unit 112. The housing 110 has a fan end 114 and a reservoir end 116.

The apparatus 100 can be affixed to an external structure 104 of arbitrary orientation and adjusted as to orientation within a wide range. Hereinafter, the fan unit 112 will be referred to as the "top" and the reservoir 108 as the "bottom."

Starting at the top, the fan unit 112 includes a fan 118 and a rotational pedestal (not shown). Any suitable fan is contemplated. The fan 118 can be a three-bladed, oscillating fan, as shown in the instant sample embodiment. Oscillation is represented by the two rotational arrows 120a, 120b. The fan 118 has an encasement 122. Within the encasement 122, there are fan blades 124a, 124b, 124c. Situated behind the fan blades 124a-c and not shown are the fan motor, oscillation gears, and four-bar mechanism which are also part of the fan unit 112.

At the front of the fan 118 is a safety grill 126 having a number of spokes 128, generally about 50 although fewer and wider spokes are, for simplicity of illustration, depicted here. At the center of the safety grill 126 is an impeller hub 130 which surrounds a centrally located mist egress head 134 having a grid of holes 132. An outflowing mist 136 emanates from the holes 132. The mist egress head 134 may, alternatively, be attached to the safety grill 126. The attachment may be a screw thread configuration, or the mist egress head 134 could be integrally molded as part of the safety grill 126.

The fan 118 is suspended by a bracket 138 that allows the fan 118 to be manually pointed in a desired vertical orientation, given that the bracket 138 is mounted atop the rotational pedestal. The fan 118, including the blades 124a-c, can be made of a rigid, durable plastic such as acrylonitrile butadiene styrene. A suitable fan unit having blades 4.33 inches in diameter and operable in any orientation is sold under the brand CAVN STROLLER FAN CLIP ON. Another clip-on fan marketed under the brand GLOVIAN for use on the beach, in the car, or in camping, or attached to a dormitory bed, has a frame diameter of approximately 3.7 inches for the encasement containing the blades. The blades of the CAVN fan can be shortened to a diameter of, for instance, 3.4 inches, 3.0 inches, or less, for a more compact apparatus 100. At a blade diameter of 3 inches, the apparatus 100 if proportioned as in FIG. 1A could easily be made under a foot long.

The housing 110 is, at the fan end 114, rigidly attached to the fan unit 112. At the top of the housing 110 there is a drain 140 for routing out any liquid dripping onto the housing 110, or any condensation forming there, as a result of the outflowing mist 136. The housing 110 may be cylindrical, may axially extend between the fan unit 112 and the reservoir 108, and may be made of a rigid metal, such as steel.

Advantageously, an exemplary inner track 142, and optionally an outer track 144, rigidly support the clamp 102 and, as shown in FIG. 1C, peripherally surround the housing 110 at least partway around, more than 90 or 180 degrees around for instance. If the housing is cylindrical, the inner and outer tracks 142, 144 circumferentially follow a circular path along and around the cylinder. In the version shown, the retaining slider 103 is positioned flat and flush against the housing 110, with the walls of the inner track 142 rising up on one side and the other of the retaining slider 103, before the walls are bent inwardly toward each other. Each of the two walls may be firmly attached to the housing 110 or molded integrally with it.

The inner track 142 may be surrounded by and reinforced by the outer track 144. The outer track 144 is seen in FIG. 2A as the upstanding structure a portion of which folds over the inner track 142 to reinforce the strength of the inner track 142 which is made of rigid metal. The inner track 142 can include a strip that resides between the retaining slider 204 and the housing 110. The inner track 142 may extend, via ridges 204a, 204b, a bit further inward toward a rigid tongue 214 than does the outer track 144. The retaining slider 103, 204 that resides within the inner track 142 provides the means by which the clamp 102 is adjusted peripherally around the housing 110 wherever the user desires. Details on the tracks 142, 144 and the clamp 102 appear further herein below.

As seen in FIGS. 1A and 1C, a touchscreen control panel 145 and a solar panel 146 are also on the periphery.

The operation of the apparatus 100 is powered by the solar panel 146, or by an alternative power source in the form of batteries 147 mounted in a battery compartment (not shown) within the housing 110. In an embodiment, the apparatus 100 is powered by batteries 147, and the solar panel 146 is used to recharge the batteries 147. In the embodiment shown in FIG. 1C, the batteries 147 within the housing 110 are chargeable for outputting power to the apparatus 100. A suitable 3.15-inch by 3.15-inch solar panel is sold under the brand SUNNYTECH 0.5W 5V 100MA MINI SMALL SOLAR PANEL MODULE DIY POLYSILICON SOLAR EPOXY CELL CHARGER B016.

The solar panel 146 may be tiltable, as in raising a hatch. This is represented in FIG. 1A by upswing and downswing arrows 148a, 148b. A friction fit may keep the solar panel 146 at the angle to which it is raised.

Another example of a tiltable solar panel for the apparatus 100 is provided in FIG. 3 of Korean Patent Publication KR102120801B1 for which its FIG. 3 and accompanying description are hereby incorporated herein by reference. As provided therein, the tilting can be set by the user at any of various angles. The angles selectable correspond to the at least one fixing groove; however, through friction fit between the sliding rod and the sliding groove, the range of angles the user can select could be made continuous.

The touchscreen control panel 145 includes, starting at the top, an on/off power switch such as a waterproof rocker switch, a digital time display, and time settings for fan only and fan-driven mist. If a number is selected for fan only and a number is selected for mist, the apparatus 100 will provide intermittent intervals of the designated number of minutes for each of fan and mist. The user can select the fan speed. Pressing "SWING" toggles fan oscillation on/off. The control panel 145 contains a computer chip for putting into effect these operational capabilities.

Electricity for the various functions is provided by wiring from the batteries 147 charged by the solar panel 146.

With reference again to FIG. 1C, a pump assembly 150 includes an integrated pump and motor 152 within the housing 110, an inlet conduit 154a from the reservoir 108, and an outlet conduit 154b to the fan unit 112. A suitable combination motor and pump is model JT-DC3V-3 sold under the brand WAYINTOP or the one disclosed in U.S. Pat. No. 8,678,781 to Imagawa et al. which, as mentioned therein, can incorporate the resonance oscillation motor shown in Japanese Laid-Open Patent Publication No. 2007-289911. FIG. 1D is a side perspective view of the integrated pump and motor 152, showing an input port 156a for receiving the inlet conduit 154a. Also shown is an output port 156b for the outlet conduit 154b. A drain conduit 158, as shown in FIG. 1C, transports liquid from the drain 140 outside an exit port (not shown) underneath the outer track 144.

The inlet conduit 154a is a flexible suction tube which when extended reaches deeply down into the reservoir 108, as seen in FIG. 1A.

FIG. 1E provides a top view of the clamp 102 attached by a proximal joint, the tongue 214, and ultimately by the retaining slider 103 to the housing 110. The proximal joint includes an axle grip 240, as discussed further herein below.

The reservoir 108 is insulated. It is capable of holding approximately 12 to 16 fluid ounces. It is collapsible for compactness as indicated by the collapse and extend arrows 160a, 160b. A collapsed state of the reservoir 108 is depicted in FIG. 1F. An attached carabiner 162 which can pivot is largely coated, as with a polymer, and has an exposed linking-portion 164. The reservoir 108, and the housing 110 at its reservoir end 116, have mating screw-thread configurations or other suitable means for providing a rigid and sealing connection. This mating is represented by the screwing and unscrewing arrows 165a, 165b.

Figure 5:
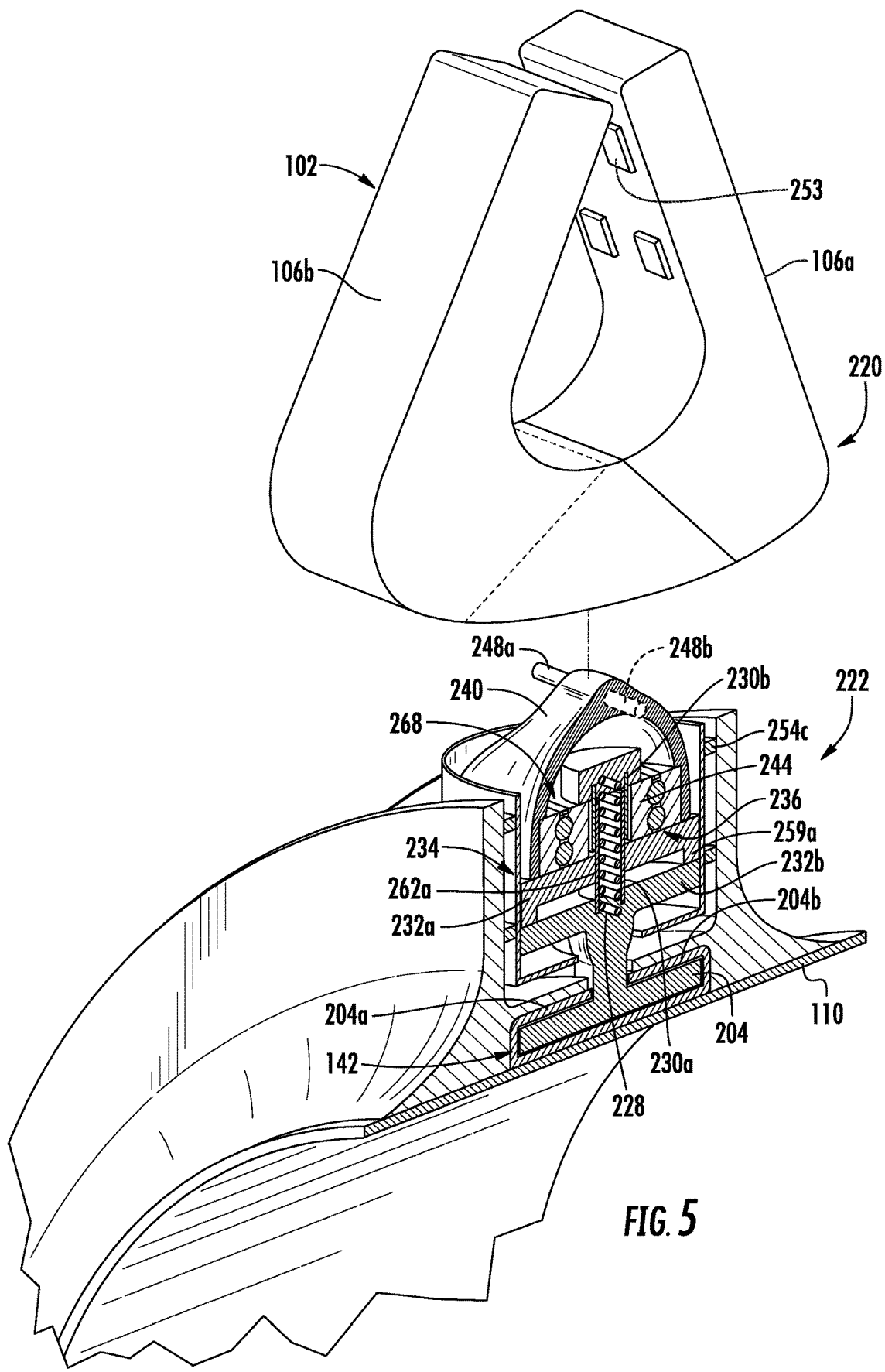
FIG. 5 is a partially-exploded perspective view corresponding to FIG. 2A. The view is sectional as to the proximal joint 222 and connecting structures on the housing 110.

FIG. 2A illustrates a side view of, by way of illustrative and non-limitative example, an exemplary attaching device 220 for the mister-fan apparatus 100. The attaching device 220 includes the clamp 102 and a proximal joint 222. FIG. 2A provides a sectional view of the clamp 102, proximal joint 222 and connecting structures on the housing 110. FIG. 5 is a partially-exploded perspective view which is sectional as to the proximal joint 222 and connecting structures on the housing 110.

Figure 2B:
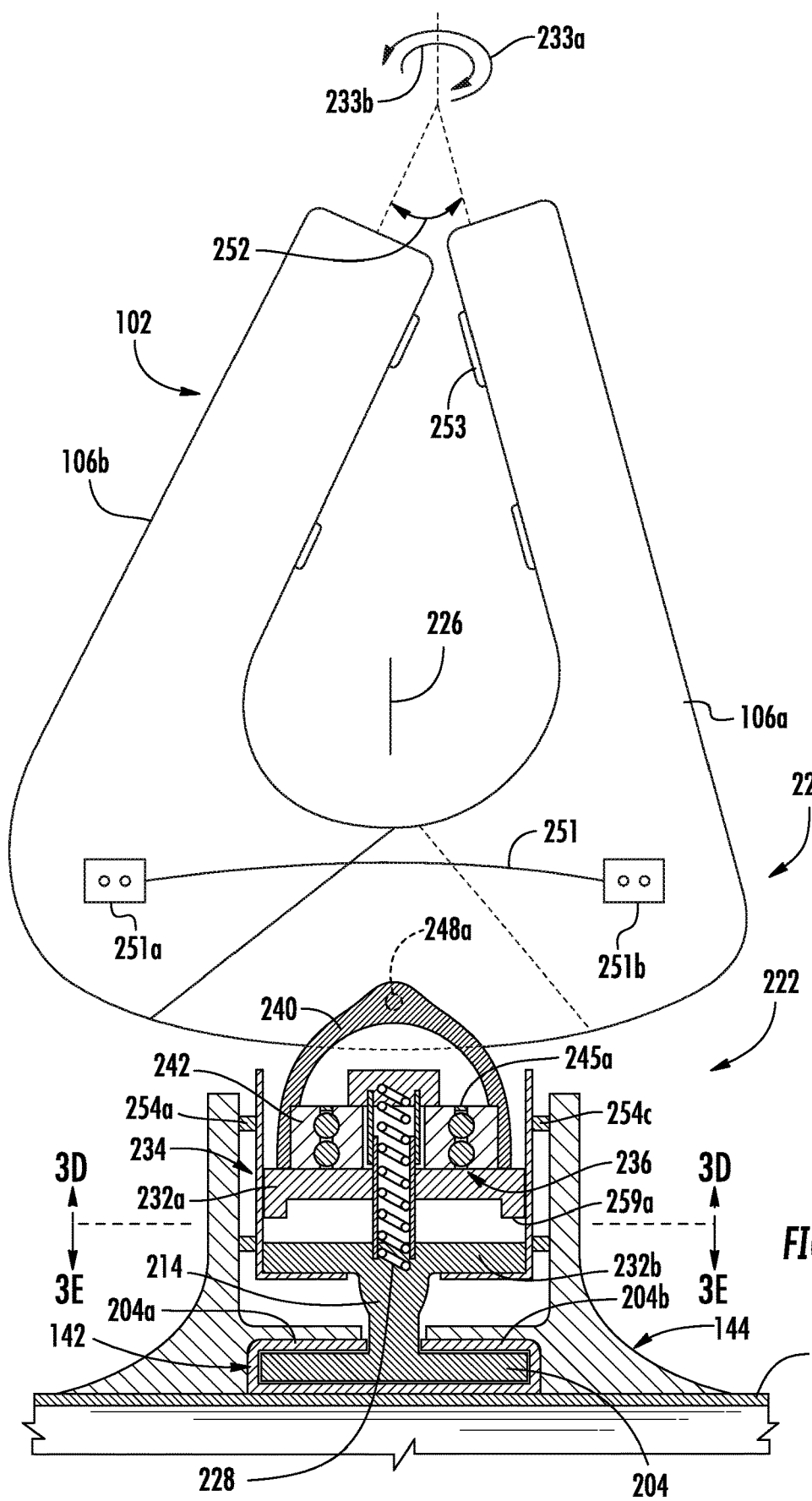
FIG. 2B is an exemplary side sectional view corresponding to FIG. 2A with the attaching device in a different operational state.
Figure 3A:
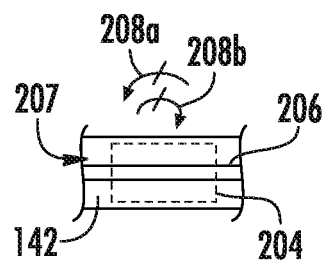
FIG. 3A is a side view of an exemplary retaining slider of the apparatus of FIG. 2A viewed from the perspective of facing the housing.
Figure 3B:
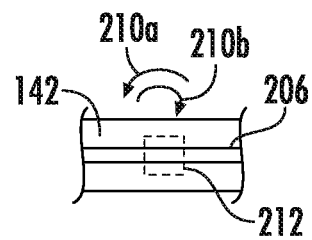
FIG. 3B is a side view of an exemplary alternative retaining slider viewed from the perspective of facing the housing.
Figure 3C:
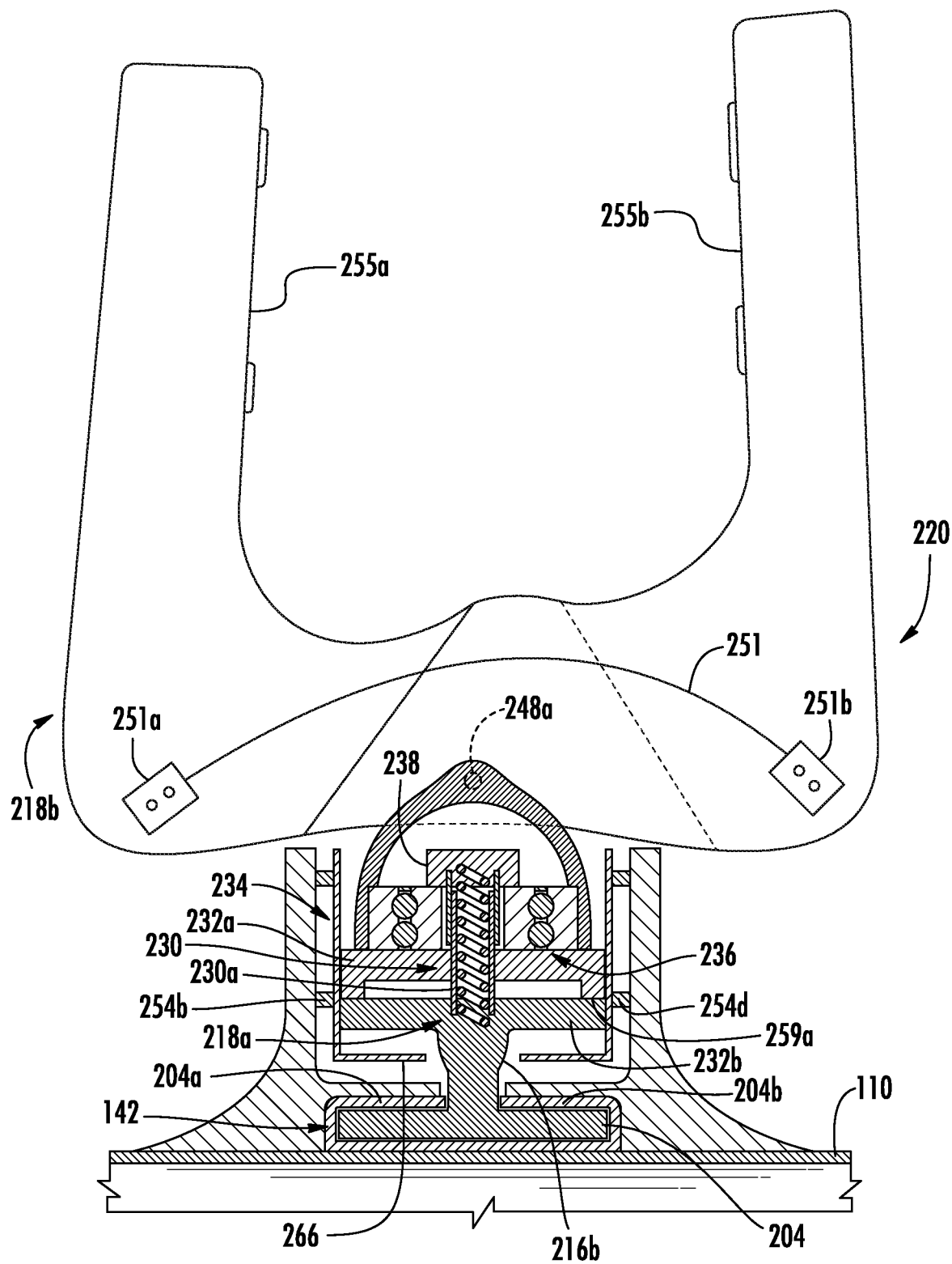
FIG. 3C is an exemplary side sectional view corresponding to FIG. 2A with the attaching device in a yet different operational state.

FIGS. 2A, 2B and 3C show the attaching device 220 in different respective operational states.

As seen in FIGS. 2A and 3A, a retaining slider 204 is immediately and closely surrounded by the inner track 142. The inner track 142 includes a pair of ridges 204a, 204b rigidly connected to the housing 110. The ridges 204a, 204b extend initially outwardly from the housing 110, and subsequently toward each other but only to an extent of leaving a separation serving as a slot 206, as best seen in FIG. 3A. The initial outward extension may concurrently include extension toward each other. The retaining slider 204 is shaped like the inner track 142. The retaining slider 204 is, by means of the clamp 102, manually slidable in the inner track 142 along the slot 206. However, the retaining slider 204 has a friction-fit 207 to the inner track 142 so as to stay in place when the sliding destination is reached.

The inner track 142, in one design, starts out as a rectangular sheet of rigid metal that is say 4 units by 25 units. With the sheet lying flat, an end-strip 1 unit by 25 units is bent up at 90 degrees. On the opposite side another 1x25 unit end-strip is bent up at 90 degrees. Therefore, the only part of the sheet lying flat is a central strip 2 units by 25 units. A, for instance, 2-unit by 3-unit retaining slider 204 is laid down flat on top of the central strip. However, connected to the retaining slider 204 is the tongue 214 and the attaching device 220 which jut up at a 90-degree angle from the retaining slider 204 and thus jut up at a 90-degree angle from the central strip. While keeping the tongue 214 and the attaching device 220 in place, the end-strips which are currently jutting up at a 90-degree angle, are bent down, almost onto the retaining slider 204, but all the way toward each other so as to form the slot 206 (see FIG. 3A) through which the tongue 214 emerges. What was originally the rectangular sheet of rigid metal has now been bent to contain the retaining slider 204 and is now essentially a 2-unit by 25-unit structure. This 2x25 unit structure is, while still containing the retaining slider 204, bent around the circumference (i.e., curved periphery) of the cylindrical housing 110. These end-strips are what has been identified herein above as the ridges 204a, 204b (see FIG. 2A).

Due to its shape, the retaining slider 204 is non-rotatable in-place within the inner track 142, as represented by rotational arrows 208a, 208b being crossed out. Thus, it is not possible to, by means of such a rotation in place, rotate the clamp 102 as a whole. So that the user can, with respect to the housing 110, circumferentially rotate the clamp 102 into the desired orientation, the inner track 142 provides clearance for the retaining slider 204 to slide.

Figure 4A:
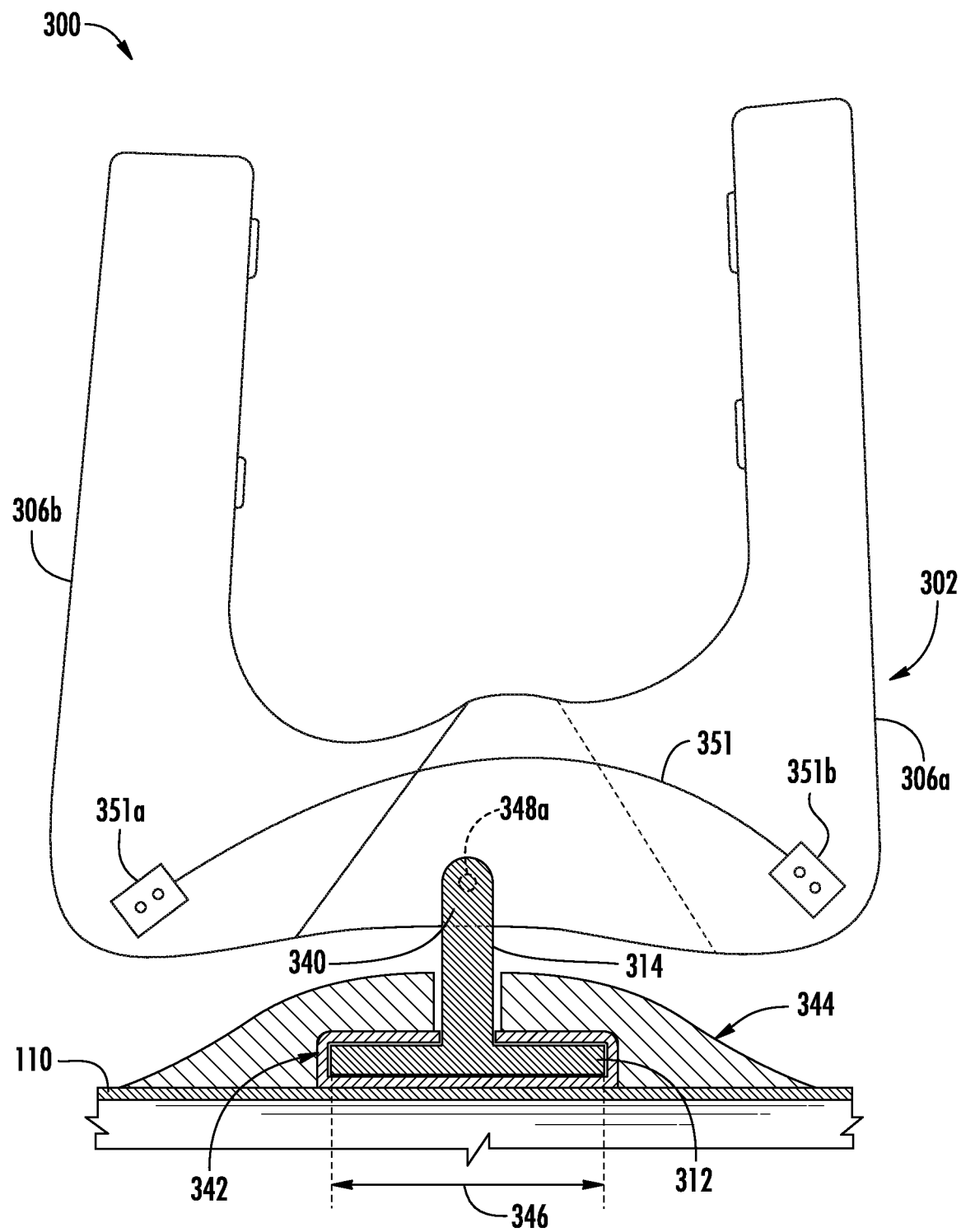
FIG. 4A is a side sectional view of the clamp of FIG. 2A and of structures, in a further variation, that connect the clamp to the housing.

There is, however, an alternative implementation in which the clamp 102 is rotated in place and, by virtue of rigid connection to an alternative retaining slider 212, the alternative retaining slider 212 likewise rotates in place. This is shown in FIG. 3B, where the rotational arrows 210a, 210b are not crossed out. The alternative retaining slider 212 can be essentially of the same thickness as the non-rotatable retaining slider 204 and likewise slidable along, and friction fitted within, the inner track 142. However, its length and width are reduced, and its shape may be altered as by rounding edges, to allow for rotation within the inner track 142. In a further variation, a disc-like retaining slider 312 is employed, as shown in FIG. 4A. Other variations may depart from a strictly disc-like shape. The alternative implementation and the further variation ordinarily utilize an always-rigid connection between the clamp 102, 302 and the retaining slider 212, 312, although the proximal joint 222 may be used instead.

In the alternative implementation (i.e., with the alternative retaining slider 212) as well as the instant implementation (i.e., with the retaining slider 204), both of which as described herein are merely examples of what is being proposed herein, the retaining slider 204 (or alternative retaining slider 212) is curved in the sideways direction in order to conform to the curve in the inner track 142 as seen in FIG. 1C. The alternative retaining slider 212 and the disc-like retaining slider 312 are sized 346, shaped and sufficiently flexible for manual rotation in place within the inner track 142. The alternative retaining slider 212 and the disc-like retaining slider 312 can be composed of strong, flexible metal such as an aluminum alloy made with nickel and lanthanum. The flexibility allows the retainer slider 212 which is shaped to conform to the circumferential contour of the housing 110, but which is uncurved in the orthogonal direction, to be manually rotated 90 degrees. Edges of the retainer slider 212 may also be rounded to assist in its manual rotation. Manual rotation by any desired angle occurs when the user manually rotates in place the clamp 102—the relatively simple means for rotation is due to an entirely rigid connection, in the alternative implementation, between the clamp 102 and the alternative retaining slider 212. Likewise, for the further variation, an entirely rigid connection between clamp 302 and the disc-like retaining slider 312 allows for the relatively simple means of rotation. The connection between the clamp 102 and the retaining slider 204 of the instant implementation is, by contrast, not at all times entirely rigid, as mentioned herein above and as will be explained in more detail herein below.

In comparison with the alternative implementation, the retaining slider 204 of the instant implementation is wider, and longer, to better retain the retaining slider 204 in the slot 206 against pulling force exerted by the rigid tongue 214. That being said, it is also possible to widen the tracks 142, 144 to accommodate in-place rotation of a larger structure.

The discussion from this point forward will pertain to the instant implementation (i.e., with the retaining slider 204) until FIG. 4A. The alternative implementation (i.e., with alternative retaining slider 212) and further variation (i.e., with disc-like retaining slider 312) are revisited further herein below.

In accordance with the instant implementation, and with reference to FIGS. 2A, 2B, and 3C, the tongue 214 may be a solid cylinder or a rectangular solid; has a track end 216a rigidly attached to, or integral with, the retaining slider 204; and is connected at the other (i.e., connection) end 216b to an extension end 218a of the attaching device 220. The opposite (i.e., attaching) end 218b of the attaching device 220 is configured for rigidly attaching to the external structure 104 and thereby rigidly supporting the mister-fan apparatus 100. This attachment to the external structure 104 may be made by the clamp 102 or by other known and suitable means. The inner and outer tracks 142, 144, the tongue 214, and the proximal joint 222 are entirely or almost entirely formed from rigid metal such as steel, nickel, or tungsten.

The attaching device 220 includes the proximal joint 222 and a distal remaining portion. In the instant implementation, the distal remaining portion is, as mentioned further herein above, the clamp 102. The clamp 102 pivots open and shut, although it could be a clamp that does not pivot open and shut. While the user makes a particular adjustment to the apparatus 100, the clamp 102 is, while the tongue 214 remains motionless, manually rotatable in place. For this rotation, a longitudinal direction of the tongue 214 serves as the in-place rotation axis 226. It is the innovative proximal joint 222 which enables the in-place rotation. For this, the user pulls the clamp 102 out (i.e., upward in FIG. 2A) enough (as in FIG. 2B) to permit the rotation. The user then rotates the clamp 102 in place by a desired amount and then locks the clamp 102 into that destination orientation. Circumferential rotation, by contrast, occurs when the user laterally moves the clamp 102 so as to slide the retaining slider 204 along the inner track 142. Accordingly, and beneficially, the clamp 102 is rotatable with two degrees of freedom.

The proximal joint 222 has the following components: a coil spring 228; a telescopic sheath 230 for the coil spring 228; mutually opposing upper and lower orientation-setting jaws 232a, 232b; a clamp extension stop 234; a double-row deep-groove ball bearing 236; a stationary cap 238; and the axle grip 240.

The double-row deep-groove ball bearing 236 includes a rotating part 242 and a stationary part 244. Therebetween, it also includes both rows of steel balls in a cage. It further includes a ring panel 245a as an outer covering over one of the rows.

As will be explained further herein below, both the stationary cap 238 and the stationary part 244 are "stationary" with respect to rotation in place, but movable upward in preparation for a "rotate-in-place" adjustment of the clamp 102 and movable downward to lock in the chosen specific orientation.

The sheath 230 includes an inner telescoping rod 230a and an outer telescoping rod 230b.

The clamp 102 has the following components: mutually-opposing pivoting clamping-jaws 106a, 106b; left and right axle portions 248a, 248b; leaf springs 250, 251; leaf spring shoulders 250a, 250b, 251a, 251b; and discrete frictional pads 253 (best seen in FIG. 5) mounted to inside surfaces 255a, 255b(as shown in FIG. 3C) of the respective clamping-jaws 106a, 106b. As seen in the drawings, the clamping-jaw 106a is, at the base 109 of the clamp 102, partially within the clamping-jaw 106b. The axle portions 248a, 248b are directly connected to the proximal joint 222. The other components will be discussed further herein below.

The proximal joint 222 is disposed within the outer track 144 but is separated from it at the top and at the bottom by two pairs of track cushions 254a, 254b, 254c, 254d that run the length of the outer track 144. The track cushions 254a, 254b, 254c, 254d can be composed of tough polymer with some flexibility.

For the attaching device 220, distal away from the housing 110 in FIG. 2A, 2B, and 3C will be herein after regarded as "up", and proximal toward the housing 110 will be regarded as "down."

FIGS. 2A, 2B, and 3C show the clamp 102 in a specific orientation that corresponds to the current orientation of the upper orientation-setting jaw 232a.

Figure 3D:
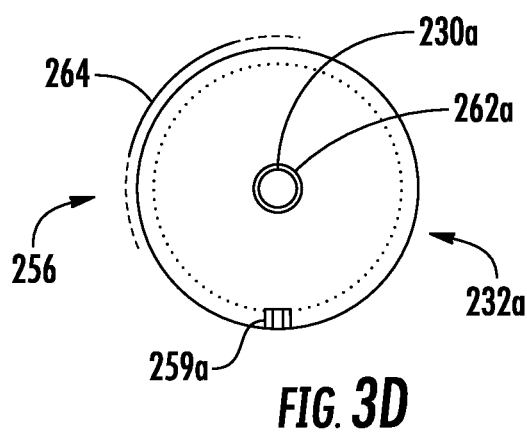
FIG. 3D is a bottom view of an exemplary upper orientation-setting jaw of the proximal joint of FIG. 2A, including adjoining structures.

The structure of the upper orientation-setting jaw 232a is shown in FIG. 3D. The upper orientation-setting jaw 232a depicted is a straight bevel gear that includes, on its periphery, an upper set 256 of 48 upper teeth 259a. One upper tooth 259a is shown and the rest are represented by the dotted line. Each upper tooth 259a is a solid polyhedron of isosceles-trapezoidal cross-section when viewed in the radial direction. The upper tooth 259a is mounted in a horizontal orientation. The corners of the shorter parallel side of the isosceles trapezoid, i.e., the distal corners, have interior angles of 135 degrees each, so that the upper and lower orientation-setting jaws 232a, 232b mesh when shut. Both corners may be slightly rounded to aid in arriving at a specific orientation when the upper orientation-setting jaw 232a is rotated and then lowered to shut the jaws 232a, 232b. The same rounding may be employed for the lower orientation-setting jaw 232b. Spiral bevel gears may be utilized instead of straight bevel gears. Part of a cylindrical skirt 264 is shown and will be explained further below. The dotted line indicates optional continuation up to or including the entire circumference. As the upper orifice 262a of the upper orientation-setting jaw 232a indicates in FIG. 3D, the center of the upper orientation-setting jaw 232a is hollow to allow the coil spring 228 and its telescopic sheath 230 to pass through. Both the coil spring 228 and the telescopic sheath 230 remain stationary when the user rotates in place the upper orientation-setting jaw 232a, and overlying structures rigidly connected thereto, in making the rotate-in-place adjustment.

Figure 3E:
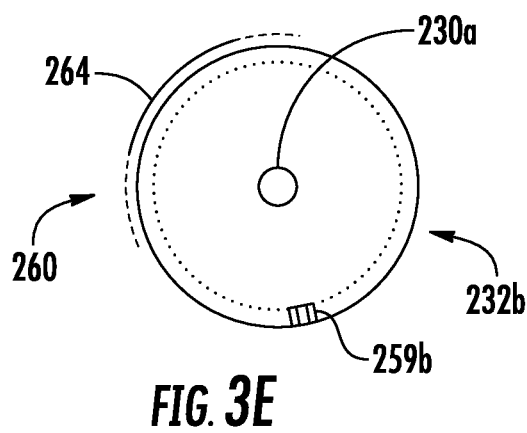
FIG. 3E is a top view of an exemplary lower orientation-setting jaw of the proximal joint of FIG. 2A, including adjoining structures.

The lower orientation-setting jaw 232b which is represented in FIG. 3E has a structure that is similar to that of the upper orientation-setting jaw 232a. Each lower tooth 259b is shaped identically, and matingly, to the shape of the upper teeth 259a. In particular, the space between any two adjacent lower teeth 259b is shaped to fit the respective upper tooth 259a when the jaws 232a, 232b meet. The lower orientation-setting jaw 232b has the same number of teeth 259b as does the upper orientation-setting jaw 232a. Although 48 teeth 259a, 259b are in the current embodiment, the upper and lower sets 256, 260 of teeth may each include a number of teeth other than 48. The axial depth at which teeth are formed can be the same for both jaws 232a, 232b or can differ. Also, although the distal corner angles of the isosceles triangle cross-section for each tooth 259a, 259b are here 135 degrees, as mentioned above, upper tooth 259a need not be identical to tooth 259b. Instead, for example, the distal corner angles for two upper and lower teeth 259a, 259b may differ from each other if each is greater than 90 and less than 135 degrees and the two add up to 270 degrees total. Other differences may be implemented as long as the teeth 259a, 259b of the jaws 232a, 232b mesh when the jaws 232a, 232b are shut.

FIGS. 2A, 2B, and 3C provide sectional views of two oppositely-located upper teeth 259a. Lower teeth 259b are not visible in these figures because, where the section is taken, each of the two upper teeth 259a is disposed directly above the space between the respective adjoining pair of lower teeth 259b.

Figure 2C:
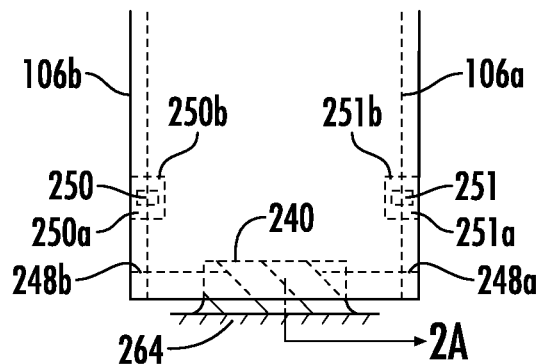
FIG. 2C is a side view of the exemplary clamp and part of the proximal joint of the attaching device of FIG. 2A viewed from the right side.

As seen from the FIG. 2A direction-of-sight arrow in FIG. 2C, we can imagine a blade lying down on the surface of sheet 2 and moving along the in-place rotation axis 226 to cut attaching device 220 right down the center. That cut right down the middle of that attaching device 220 exposes its innards and this is what we see in FIG. 2A. This same blade cuts down the center two upper teeth 259a that are positioned 180 degrees away from each other. In particular, thinking of the isosceles trapezoid (discussed further herein below), the cut bisects both the base and the top side of the trapezoid. The two bisected teeth 259a are seen in FIG. 2A. One of the teeth 259a (i.e., on the right side of FIG. 2A) is labeled. As for the lower teeth 259b, they are not cut and thus not bisected. The cut misses the lower teeth 259b altogether. It instead cuts the lower orientation-setting jaw 232b between two adjoining lower teeth 259b. This happens between adjoining lower teeth 259b twice, i.e., at one location of the lower orientation-setting jaw 232b and again 180 degrees away on the opposite side of the lower orientation-setting jaw 232b. Since, on the lower orientation-setting jaw 232b, the cut misses the lower teeth 259b, FIG. 2A does not show the lower teeth 259b at all. The same holds for FIG. 2B, because merely raising the upper orientation-setting jaw 232a does not make the lower teeth 259b, hidden in FIG. 2A, appear in FIG. 2B.

The lower orientation-setting jaw 232b is, unlike the upper orientation-setting jaw 232a, integral with, or otherwise firmly attached to, the tongue 214 and stationary with respect to in-place rotation of the clamp 102. The lower set 260 of lower teeth 259b interlockingly mates with the upper set 256 when the two sets 256, 260 are brought together, the teeth 259a of one jaw 232a filling spaces between the teeth 259b of the other jaw 232b. Thus, 48 specific orientations of the upper orientation-setting jaw 232a are possible in the embodiment shown, at 7.5-degree intervals. As seen in comparing FIG. 3D to FIG. 3E, the lower tooth 259b is slightly offset from the upper tooth 259a. All lower teeth 259b are therefore likewise slightly offset from adjoining upper teeth 259a, representing that the upper and lower teeth 259a, 259b can be enmeshed when the upper and lower orientation-setting jaws 232a, 232b are shut. FIGS. 3D and 3E jointly demonstrate an example of a specific orientation at which the upper and lower orientation-setting jaws 232a, 232b would mesh.

The double-row deep-groove ball bearing 236 (containing two concentric rows of steel balls) sits above the upper orientation-setting jaw 232a. The rotating part 242 serves as the outer ring. It is firmly attached to the top of the upper orientation-setting jaw 232a.

The double-row deep-groove ball bearing 236 is, by its rotating part 242, also firmly attached to the axle grip 240 which is rigidly connected to the axle portions 248a, 248b made of hardened steel. The axle portions 248a, 248b are aligned concentrically so as to function like a single axle. The axle grip 240 is essentially an irregularly-shaped dome. It is dome-like in the FIG. 2A cross-section, but, in the portion above the cylindrical skirt 264, smoothly transitioning to a three-dimensional figure of rectangular cross-section in the orthogonal direction shown in FIG. 2C. In the portion below the top of the cylindrical skirt 264, the axle grip 240 is dome-like, having, for example, concentric circular cross-sections of progressively greater magnitude in the downward direction. Ultimately, the cross-section is slightly larger than that of the circular cross-section of the double-row deep-groove ball bearing 236 where the latter meets the axle grip 240. In extending down from the axle portions 248a, 248b to meet the rotating part 242, the axle grip 240 forms a hollow area and is free of the stationary cap 238.

The axle grip 240, axle portions 248a, 248b, rotating part 242, upper orientation-setting jaw 232a and clamp extension stop 234 rotate in unison with the clamp 102 when the user manually rotates the clamp 102 in place about the in-place rotation axis 226. Accordingly, when the user makes the adjustment of manually rotating the clamp 102 about the in-place rotation axis 226, the upper orientation-setting jaw 232a rotates in unison. In another version of what is proposed herein, a single, continuous axle replaces the axle portions 248a, 248b; accordingly, the top of the axle grip 240, instead of being shaped for bridging axle portions 248a, 248b, splits into two parts that collectively bracket the single, continuous axle. This version is discussed further below with regard to an alternative design for the clamp 102.

Despite the above-described rotation in unison, the lower orientation-setting jaw 232b which is rigidly connected to the retaining slider 204 in the inner track 142 cannot rotate about the in-place rotation axis 226.

Instead, the rotate-in-place (FIG. 2B, rotational arrows 233a, 233b) adjustment by the user is enabled when the upper orientation-setting jaw 232a is pulled up (FIG. 2B, distal arrow 233c) high enough that its upper set 256 of upper teeth are entirely above, and thus clear of, the lower set 260 of the lower orientation-setting jaw 232b. FIG. 2B shows, for clarity of illustration, more clearance than would be needed.

With this clearance, the user can rotate in place the clamp 102 to arrive at an orientation that will contribute toward determining the orientation of the fan 118, and the orientation of the solar panel 146, when the apparatus 100 is attached to the external structure 104.

This flexibility is a beneficial feature, because the external structure 104 available to the user at any given time is of arbitrary orientation.

If, in addition, the user manually peripherally rotates around the tracks 142, 144 the clamp 102, the peripheral rotation additionally contributes to the orientation of the fan 118, and the solar panel 146, with respect to the external structure 104. Oscillation mode for the fan 118 is a further additive option available to the user for favorably directing the mist 136. As to the solar panel 146, it is independently tiltable, as described further herein above. These steps in adjusting orientation can be done in any order.

The lifted upper orientation-setting jaw 232a, once set to the desired orientation, is lowered back into alignment with the lower orientation-setting jaw 232b and firmly locked into alignment to provide rigid support for the apparatus 100.

The lowering back into locking alignment is facilitated by an elastic restorative force the user creates in lifting the upper orientation-setting jaw 232a.

More specifically, the upper orientation-setting jaw 232a has an upper orifice 262a for the coil spring 228.

The coil spring 228 is, at one end, firmly embedded within the stationary cap 238 which can be a solid disc of metal such as steel or aluminum. The stationary cap 238 sits atop a radially central portion of the double-row deep-groove ball bearing 236. That central portion is hollow except for the telescopic sheath 230, and the coil spring 228 within the telescopic sheath 230. The metal entirely fills the stationary cap 238. This includes filling the end-portion of the sheath 230 that is placed to reside within the stationary cap 238. The top of the coil spring 228 is therefore embedded in the metal that forms the solid-metal stationary cap 238. The coil spring 228 may extend a bit outside (i.e., over) the top of outer telescoping rod 230b, thereby fortifying the grip of the stationary cap 238 on the coil spring 228.

At the other end, the coil spring 228 is firmly embedded within the tongue 214 and/or a lower part of the lower orientation-setting jaw 232b. In the embodiment shown in the drawings, the embedding is into the base of the lower orientation-setting jaw 232b, and the jaw 232b is formed integrally with the tongue 214 and the retaining slider 204.

The stationary cap 238 is rigidly mounted onto the stationary part 244. Likewise, the tongue 214 is stationary with respect to the rotate-in-place adjustment of the clamp 102 in the instant implementation.

The stationary part 244 is essentially a ring. The rotating part 242 is essentially a ring that concentrically surrounds the stationary part 244.

The stationary part 244 and the rotating part 242 may be held together by steel balls in a shape-conforming ball bearing track jointly formed by the rotating and stationary parts 242, 244.

The ring panel 245a protects the double-row deep-groove ball bearing 236 from contamination entering the gap 268. It also helps to retain lubrication such as grease. The ring panel 245a may have its inner and outer peripheries inserted into two concentric annular grooves (not shown) in the rotating and stationary parts 242, 244, respectively. The fit is loose into at least one of the two grooves to allow for manual rotation of the clamp 102. The ball bearings of a row are kept apart from each other at an interval by a cage (not shown), as well known in the art. Another ring panel may be provided at the opposite end of the cylindrical gap 268.

The radial center of the stationary part 244 is hollow, thereby allowing the coil spring 228 to pass through. The coil spring 228 may extend a bit outside (i.e., under) the bottom of inner telescoping rod 230a. This bit that extends outside, as well as the surrounding end of the inner telescoping rod 230a, are embedded in the metal molded to form the lower orientation-setting jaw 232b, tongue 214, and retaining slider 204.

The coil spring 228 biases the upper and lower orientation-setting jaw 232a, 232b shut by exerting a downward pulling force on the upper orientation-setting jaw 232a.

In making the rotate-in-place adjustment, the user initially manually applies a countervailing upward force that pulls the upper orientation-setting jaw 232a clear of the lower orientation-setting jaw 232b. With that clearance, the user turns the clamp 102 so as to revolve the upper orientation-setting jaw 232a by a targeted or desired amount. Finally, the user reduces his/her pulling force to let the upper orientation-setting jaw 232a settle down (FIG. 2A, proximal arrow 233d) into a targeted or desired specific orientation. The settling down ordinarily would, at the urging of the coil spring 228, entail at least some slight rotational shift of the upper set 256 of teeth into meshing alignment with the lower set 260.

The order of operations in making the rotate-in-place adjustment is represented by the early process transition arrow 263a (FIG. 2A->FIG. 2B), the distal arrow 233c (raising the upper orientation-setting jaw 232a), the rotational arrows 233a, 233b (rotating the clamp 102), the proximal arrow 233d (letting the clamp 102 settle down into the selected orientation), and the late process transition arrow 263b (i.e., FIG. 2B->FIG. 2A, returning the attaching device 220 to the initial operational state). The idea is that, with FIG. 2A placed to the left of FIG. 2B, as we transition left-to-right from the FIG. 2A mode of operation to the FIG. 2B mode of operation, the upper part of the proximal joint 222 is elevated (as represented by the up arrow). Conversely, as the upper part of the proximal joint 222 is manually released so that the coil spring 228 lowers that upper part (as represented by the down arrow), we transition right-to-left from the FIG. 2B to the FIG. 2A mode.

The "upward" force required of the user to make the rotate-in-place adjustment can be regarded as an outward force applied by one hand while the other hand holds a remaining portion of the apparatus 100 near the proximal joint 222, the housing 110 for example. The coil spring 228 is designed with a Young's modulus such that this outward force just exceeds the weight of the mister-fan apparatus 100 with the reservoir 108 full of water. Thus, the apparatus 100 is, even with its supply of water just replenished, securely held to the external structure 104. Advantageously, the base 109 of the clamp 102 is designed ergonomically wide and curved so that the fingers of a hand can be distributed on both sides of the proximal joint 222. Accordingly, despite the above-described manual force needed to make the rotate-in-place adjustment, the user can with one hand grab the base 109 of the clamp 102 and, with the other hand holding a remaining portion of the apparatus 100 near the proximal joint 222, easily apply a sufficient amount of the manual force.

As mentioned herein above, the coil spring 228 is, at one end, firmly embedded within the stationary cap 238. At the other end, the coil spring 228 of the embodiment shown in the figures is firmly embedded within the tongue 214.

For the coil spring 228 which extends axially through the proximal joint 222, a longitudinally intermediate portion may be reinforced against bending along the tracks 142, 144 by enclosing that portion within the telescopic sheath 230, i.e., a miniature, outer, closely-surrounding sheath of metallic telescopic tubing. The user would not ordinarily move the clamp 102 in a longitudinal direction along the tracks 142, 144 until the rotate-in-place adjustment is completed. In other words, until the user has relaxed his/her pulling the clamp 102 away from the housing 110 and permitted the clamp 102 to return, resulting in the rigid proximal joint formation seen in FIG. 2A. However, if the user does, while the clamp 102 is in an extended position as in FIG. 2B, apply force to the clamp 102 in a longitudinal direction along the tracks 142, 144, the telescopic sheath 230 affords protection against bending, and possibly overbending, the coil spring 228. The sheath 230, as mentioned herein above, includes the inner telescoping rod 230a and the outer telescoping rod 230b. The exterior of the top of the outer telescoping rod 230b is rigidly embedded within the stationary cap 238. The exterior of the bottom of the inner telescoping rod 230b is rigidly affixed to or embedded within the upper part of the tongue 214 and/or a lower part of the lower orientation-setting jaw 232b. When the user opens the jaws 232a, 232b, the coil spring 228 expands and the sheath 230 telescopically expands simultaneously. When the user releases and thereby allows the jaws 232a, 232b to shut, the coil spring 228 contracts. The shutting of the jaws 232a, 232b also makes the sheath 230 telescopically contract by sliding the outer telescoping rod 230b further over the inner telescoping rod 230a. A suitable tubing is sold under the brand SMALL BRASS TELESCOPIC TUBING by K&S Precision Metals.

The clamp extension stop 234 prevents the coil spring 228 from being overstretched. The clamp extension stop 234 includes the cylindrical skirt 264 and, at the bottom end of the cylindrical skirt 264, a horizontal lip 266. The cylindrical skirt 264 is securely affixed to the periphery of the upper orientation-setting jaw 232a, is rigid, and may be made of steel for example. As seen in FIGS. 2A and 3C, the horizontal lip 266 by default enforced by the coil spring bias on the upper orientation-setting jaw 232a, resides down near the ridges 204a, 204b. When the user makes a rotate-in-place adjustment by initially pulling up the clamp 102, the pulling causes the cylindrical skirt 264, and the horizontal lip 266 connected to or integral with it, to slide upward. The cylindrical skirt 264 may be provided with low-friction outer coating such that sold under the brand name TEFLON. The upward movement can reach a limit because the horizontal lip 266 is restrained by the bottom of the lower orientation-setting jaw 232b. The horizontal lip 266 may extend radially inward as far as the bottom of the lower orientation-setting jaw 232b does before meeting the tongue 214. It likewise may extend inward circumferentially up to 360 degrees. Sufficient inward circumferential extension fortifies the proximal joint 222 against being bent by the user in a track 142, 144 direction, even when the clamp 102 has been manually pulled out into an extended mode of operation as in FIG. 2B. In some such designs, the telescopic sheath 230 which likewise provides this fortification is optional.

FIG. 2C is a left-to-right side view of most, i.e., the top part, of FIG. 2A. As mentioned further herein above, clamp 102 has the following components: mutually-opposing pivoting clamping-jaws 106a, 106b; axle portions 248a, 248b; leaf springs 250, 251; leaf spring shoulders 250a, 250b, 251a, 251b; and discrete frictional pads 253. The leaf springs 250, 251 are correspondingly fitted to sit within and/or are affixed to the leaf spring shoulders 250a, 250b, 251a, 251b. As the user pulls apart the mutually-opposing pivoting clamping-jaws 106a, 106b, the leaf springs 250, 251 flex as seen by comparing FIG. 3C to FIG. 2A or FIG. 2B. Due to the resilience of the leaf springs 250, 251, the flexed state provides a countervailing force to the force the user is applying. The countervailing force develops because the clamp 102 is biased by the leaf springs 250, 251 to urge the mutually-opposing pivoting clamping-jaws 106a, 106b shut. The urging shut forms, as seen from comparing FIG. 3C to FIG. 2A or to FIG. 2B, an acute angle 252 at a distal vertex and causes the mutually-opposing clamping-jaws 106a, 106b to be closer to each other distally 233c than proximally 233d. The fact that the clamping-jaws 106a, 106b have pivoted shut, as suggested by FIGS. 2A and 2B, does not necessarily mean that the clamping-jaws 106a, 106b have distally neared each other to the extent of distally touching each other. It may, for instance, be the case that the spring bias when the clamping-jaws 106a, 106b are sufficiently close but not touching, is insufficient to overcome frictional resistance. The leaf springs 250, 251 can be configured in any known and suitable manner with a Young's modulus high enough to securely clamp onto the external structure 104 and thereby support the mister-fan apparatus 100 and, yet, low enough so that the mutually-opposing pivoting clamping-jaws 106a, 106b can normally be directly manually pried apart far enough to grip external structures 104 of different shapes and sizes and of any arbitrary orientation.

The clamping-jaws 106a, 106b are internally round near the axle portions 248a, 248b which serve as a fulcrum.

Advantageously, the user inserts fingers into a proximal separation 107 between the clamping-jaws 106a, 106b such as the opening 105 provided by the round shape to easily pry apart the clamping-jaws 106a, 106b without the need for tools. For instance, the prying apart could be tailored to the average strength of a 9-year-old boys using the index and middle fingers of each hand, although a different standard such the average strength of 10-year-old boys may be used instead.

As seen from FIGS. 2A, 2B, 2C, and 3C, the axle portions 248a, 248b serve as a fulcrum for the mutually-opposing pivoting clamping-jaws 106a, 106b. In particular, the clamping-jaws 106a, 106b each serve as the type of lever for which the resistance (i.e., leaf springs 250, 251) is located between the fulcrum (i.e., axle portions 248a, 248b) and the effort (i.e., user's finger(s)). The user therefore has the benefit of exerting leverage on the leaf springs 250, 251 when the user manually pries the clamping-jaws 106a, 106b apart.

This same round shape within the clamping-jaws 106a, 106b adapts them for circumferentially grabbing, for support, a cylindrical object serving as the external structure 104. Yet, the clamp 102 securely grabs flat surfaces within a wide range of thicknesses. The discrete frictional pads 253 enhance the grip. Four somewhat flat discrete frictional pads 253 on each clamping-jaw 106a, 106b each have a rectangular gripping surface, so that the clamp 102 can temporarily and yet securely clip onto any arbitrary flat surface (e.g., table top) within limits.

In comparison to the instant mister-fan apparatus 100, the mister-fan apparatus 300 without a proximal joint has a much simpler construction, as illustrated in FIG. 4A which is, like FIGS. 2A, 2B and 4C, a side sectional view. The user, in manually rotating a clamp 302, rotates in place a disc-like retaining slider 312 (or the alternative retaining slider 212) in unison. There is thus no need for a rotating jaw that can be raised and can be lowered to interlock with a stationary jaw. Instead, an axle grip 340 for gripping an axle, or axle portions 348a, 348b can be rigidly attached to a tongue 314 (which may be cylindrical near the inner and outer tracks 142, 144), with no intervening coil spring, sheath, orientation-setting jaws, or bearing. There is no proximal joint to stabilize. The outer track 344 therefore can, although it still reinforces an inner track 342, be reshaped not to jut out distally 233c from the housing 110. The outer track 344 instead serves merely as a second layer over the inner track 342.

Figure 4B:
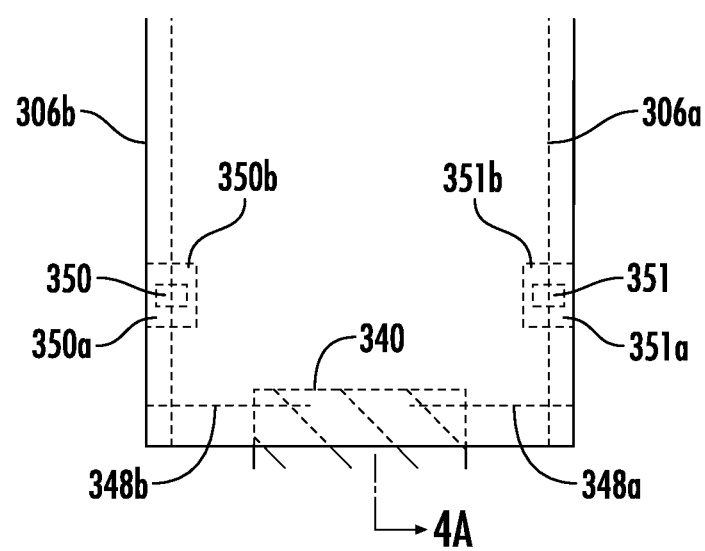
FIG. 4B is a side view of the exemplary clamp and part of the tongue of the apparatus of FIG. 4A viewed from the right side.

The clamp 302 of this further variation can be identical to the clamp 102 of the instant implementation. As shown in FIGS. 4A and 4B, mutually-opposing pivoting clamping-jaws 306a, 306b have respective leaf spring shoulders 350a, 350b, 351a, 351b for supporting leaf springs 350, 351.

Among the advantages the mister-fan apparatuses 100, 300 enjoy is affording, to the user, selection from a wide range of directions for the outflow, as in US 2018/0266714 to Perrelle; yet, the mister-fan apparatus 100, 300 is more compact and sturdier, and includes the solar panel 146 that can be swung into the desired orientation to best point at the sun. The external structure 104 to which the apparatus 100, 300 is attached can be, for example, a pole of any orientation, or a flat surface also of any orientation.

In the case of a pole, the attachment means, e.g., clamp, of a prior-art device may be adjustable by rotating the attachment means around the pole to the desired position at which to fix the attachment. If oscillation is featured, the outflow direction available extends, by virtue of the oscillation, further, i.e., over an oscillation range.

For the mister-fan apparatuses 100, 300 proposed herein, assuming the clamp 102 is fixed at a given clamped orientation around the pole, a large range of coplanar directions is available by selectively rotating the base 109 with respect to the clamp 102 (i.e., sliding within the tracks 142,144, as seen from FIGS. 1A and 1C). For each direction from among the resulting range of coplanar directions, numerous unique outflow directions are available according to the user's adjustment. For the instant apparatus 100, this is due, in part, to the clamp 102 being in addition, by virtue of the innovative proximal joint 222, rotatable in place (about its axis 226) over 360 degrees—for the alternative retaining slider 212 and the disc-like retaining slider 312, rotation in place is likewise available over 360 degrees. The resulting outflow directions are further compounded by rotation of the apparatus 100, 300 radially around the pole. Although, theoretically there exist, by virtue of sliding within the tracks 142,144, an infinite number of coplanar outflow directions, let us say that, due to real-world limitations, there exist merely 300 coplanar directions. We can make a similar compounding assumption of 300 real-world radial directions as the apparatus 100, 300 is revolved around the pole. If then, for example, the user of the instant apparatus 100 can select from among the 48 in-place positions mentioned herein above (i.e., 48 specific orientations of the upper orientation-setting jaw 232a), 300 coplanar directions, and 300 clamping positions radially around the pole, the user has available to him for selection by virtue of manual adjustments on the order of 48×300×300=4,320,00 outflow directions selectable even when the fan 118 of the instant apparatus 100 is implemented as non-oscillating. If the fan 118 features oscillation, even more outflow directions are available for either apparatus 100, 300. In fact, referring again to FIGS. 1A and 1C, the tracks 142, 144 can be lengthened and the oscillatory outflow directions centered oppositely to afford a range of even more outflow directions for either apparatus 100, 300. Moreover, with the alternative retaining slider 212 or the disc-like retaining slider 312, there are many more than merely the 48 in-place positions.

In the case of clipping to a flat surface, radial adjustments are limited so as to afford sufficient clamping strength for supporting an apparatus 100, 300 with its reservoir 108 fully filled. However, in-place rotation and in-track sliding are both available. As to even just these latter operations, the instant mister-fan apparatus 100 can be adjusted to point the outflow in any from among a large range of directions (specifically, on the order of 14,400 (i.e., 300 coplanar directions×48 in-place positions) when using the proximal joint 222 and even more when using the alternative or disc-like retaining slider 212, 312, as per the discussion immediately above). Again, if the fan 118 oscillates and/or the tracks 142, 144 are lengthened and positioned optimally with respect the oscillatory outflows, even more outflow directions are available for either apparatus 100, 300.

The portable mister-fan apparatus 100, 300 is designed for use after being affixed to a nearby structure of arbitrary orientation. With so many different outflow directions the user can attain, it is likely the user can manipulate the apparatus 100, 300 to direct outflow toward himself/herself. The user is thus confident he/she can beneficially use the compact and rugged apparatus 100, 300 throughout his/her travels despite uncertainty as to what ambient supporting structures will exist, and where the user will be located in relation to them, at any given time.

Moreover, the user can swing the solar panel 146 to an optimal orientation for capturing sunlight for powering or recharging the apparatus 100, 300.

FIG. 5 is a partially-exploded perspective view corresponding to FIG. 2A. The view is sectional as to the proximal joint 222 and connecting structures on the housing 110A. A sample procedure for making the attaching device 220 is now discussed.

In this exemplary embodiment, the base 109 of the clamp 102 has an aperture (not shown) for the axle grip 240. The aperture is wide enough to provide from the axle grip 240 clearance both when the clamping-jaws 106a, 106b are open to the widest extent and when they are shut. The aperture could be somewhat rectangular and may, for example, be in one dimension about as long as the upper and lower orientation-setting jaws 232a, 232b and, in a perpendicular direction, about as wide as the axle grip 240 appears in FIG. 2C.

The rotating part 242 of the double-row deep-groove ball bearing 236 is securely attached onto the upper orientation-setting jaw 232*a* by for example welding, soldering, or gluing. The double-row deep-groove ball bearing 236 and the upper orientation-setting jaw 232*a* therefore now are fixedly attached to each other. The stationary part 244 is lubricated, as with grease, where it faces the upper orientation-setting jaw 232*a*, because the latter rotates. The coil spring 228 is inserted into the telescopic sheath 230. Fitting slidingly, via the upper orifice 262*a*, over the spring 228 and sheath 230 and stacked on top of the lower orientation-setting jaw 232*b* is the upper orientation-setting jaw 232*a* upon which the double-row deep-groove ball bearing 236 is fixedly attached. At one end of the telescopic sheath 230 containing the coil spring 228, they are insert molded into the stationary cap 238, i.e., over-molded by the metal that fills a mold to form the stationary cap 238. At the other end of the telescopic sheath 230 containing the coil spring 228, they are over-molded by the rigid metal, such as steel, that fills a mold for the tongue 214 and, as seen in the drawings, the lower orientation-setting jaw 232*b* and retaining slider 204 as well. In other versions, the retaining slider 204 may otherwise be securely attached to the tongue 214, as by welding, soldering, or gluing, or by being inserted into a mold for the tongue 214. In some of such versions, the tongue 214 may likewise be securely attached onto the bottom of the lower orientation-setting jaw 232*b*, and the latter may have a lower orifice through which an end of the coil spring 228, surrounded by the inner telescoping rod 230*a*, is inserted.

The axle grip 240 is formed by metal injection molding, a process that combines metal powder, injection molding and sintering.

The left and right axle portions 248*a*, 248*b* are screwed into drill holes made on opposite sides of the axle grip 240. For this purpose, each axle portion 248*a*, 248*b* is provided at one end with a thread-forming screw. Alternatively, the holes are pre-configured for the metal injection molding, and the axle portions 248*a*, 248*b* are screwed into the pre-configured holes.

The clamp extension stop 234 is secured at least partially around the periphery of the upper orientation-setting jaw 232*a*, as an outer layer of the proximal joint 222.

An example of an assembly procedure for an exemplary embodiment of the proximal joint 222 is as follows:

1. Insert the coil spring 228 into the telescopic sheath 230. Let the end of the coil spring 228 overextend a bit the outer telescopic rod 230*b*.

2. Insert into the mold for the stationary cap 238 the top of the outer telescopic rod 230*b* including the top of the coil spring 228.

3. Attach the double-row deep-groove ball bearing 236 on top of the upper orientation-setting jaw 232*a* with grease being provided between the stationary part 244 and the upper orientation-setting jaw 232*a*.

4. Grease the cylindrical inner side of the double-row deep-groove ball bearing 236 and the outer side of the outer telescoping rod 230*b* adjacent to that inner side.

5. Extend telescopically the inner telescoping rod 230 and grease its outer surface.

6. Attach the stationary cap 238 to the double-row deep-groove ball bearing 236 while inserting the telescoping sheath 230 through the hollow center of the bearing 236 and the upper orifice 262*a*.

7. Insert the bottom of the inner telescoping rod 230*a*, together with the lower end of the coil spring 228 (which may likewise overextend a bit the rod 230*a*), into the lower jaw 232*b*/tongue 214/retaining slider 204 mold.

8. Screw the axle portions 248*a*, 248*b* into both sides of the axle grip 240.

9. Attach the axle grip 240 onto the double-row deep-groove ball bearing 236 and the upper orientation-setting jaw 232*a*.

10. Fix the clamp extension stop 234, initially two half cylinders, one part 180 degrees around the periphery of the upper orientation-setting jaw 232*a*, the other part 180 degrees around the remaining periphery of the upper orientation-setting jaw 232*a*.

The mutually-opposing pivoting clamping-jaws 106*a*, 106*b* each have, as mentioned further herein above, their own respective leaf springs 250, 251; leaf spring shoulders 250*a*, 250*b*, 251*a*, 251*b*; and discrete frictional pads 253.

Leaf springs 250, 251 and the shoulders 250*a*, 250*b*, 251*a*, 251*b* are disposed within the hollow clamp 102, therefore are not visible to the user, and are thus not shown in FIG. 5. The broken lines in FIG. 5 show what is just below the surface of the structure visible of the clamp 102 in FIG. 5.

Mutually-opposing pivoting clamping-jaws 106*a*, 106*b* are originally two separate pieces. The clamping-jaw 106*a* has two holes (not shown) at the base 109 through which the axle portions 248*a*, 248*b*pass. In assembling the clamp 102, first the axle portions 248*a*, 248*b* are screwed into the axle grip 240. The clamping-jaw 106*a* is then manually expanded at the base 109 to slip over the axle portions 248*a*, 248*b* (See Fig. 2C) so that the axle portions 248*a*, 248*b* pass through the two holes, respectively. Two rotary bearings (not shown) are then affixed respectively to the two free ends of the axle portions 248*a*, 248*b*. Inside clamping-jaw 106*b* at the base 109 are two axle wells (not shown) for snapping onto the rotary bearings. With the leaf spring 251 in the leaf spring shoulder 251*a* of clamping-jaw 106*b*, and with the leaf spring 250 in the leaf spring shoulder 250*a* of clamping-jaw 106*b*, the clamping-jaw 106*b* is then manually expanded at the base 109 to slip over and snap onto the rotary bearings. This occurs while the other ends of the leaf springs 250, 251 are inserted into the leaf spring shoulders 250*b*, 251*b* of the clamping-jaw 106*a* (see FIG. 2C).

An alternative design for a clamp is the spring-loaded clamp 260 in FIGS. 3 and 4 of U.S. Pat. No. 7,249,779 to Ehrenreich et al (hereinafter "Ehrenreich"). Ehrenreich FIGS. 3 and 4 and accompanying text in the Ehrenreich specification are hereby incorporated herein by reference. For this design, the axle portions 248*a*, 248 are both lengthened. The unattached end of each is bent upward and then inward so that the two unattached ends meet, forming essentially a square ring of rigid metal. The bends inward form the axle 310 in FIG. 4 of Ehrenreich. The Ehrenreich upper grasping members 320*a*, 320*b* can be substantially shortened to the point where they are still long enough to be pivotally urged apart by the Ehrenreich spring 300. The Ehrenreich pins 340 can be removed, or they can be replaced by the above-described discrete frictional pads 253 mounted to inside surfaces respectively of the first and second halves 280, 290 of the Ehrenreich clamp 260. The Ehrenreich first and second halves 280, 290 correspond to the clamping-jaws 106*a*, 106*b* proposed herein above. Both halves 280, 290: a) are biased to pivot toward each other at a fulcrum in order to pivot shut at which point the halves 280, 290 are closer to each other distally than proximally; and b) can be distally extended with straight portions, so that both cylindrical and flat structures can be grasped securely. Thus, both the opening 105 and the proximal separation 107 are made features of the resulting embodiment. For the extended straight portions, discrete frictional pads 253 can be mounted to inside surfaces of the straight portions.

The inner and outer tracks 142, 144 for retaining and stabilizing the clamp 102 are, as detailed further herein above, installed around the housing 110. This is done after the attaching device 220 is, by means of the retaining slider 204, held by the inner and outer tracks 142, 144. The inner track 142 is installed by firmly attaching the exterior of the central strip around the periphery of the housing 110. Then, the outer track 144 is likewise firmly attached to the housing 110 to enclose and structurally reinforce the inner track 142. So that the user can, with respect to the housing 110, circumferentially rotate the clamp 102 into the desired orientation, the outer track 144 is positioned when installed so that the track cushions 254a, 254b, 254c, 254d touch the cylindrical skirt 264 lightly enough to allow for the sliding. The track cushions 254a, 254b, 254c, 254d are physically separate from each other. Each one of the track cushions 254a, 254b, 254c, 254d is a ring, or a ring portion, that runs slightly above but along the curved surface of the cylindrical housing 110. In particular, track cushions 254a, 254b are concentric. Likewise, track cushions 254c, 254d are concentric. The track cushions 254a, 254b, 254c, 254d may be composed of a soft, low-friction, weathering-resistant polymer such as PTFE. In an alternative implementation (FIGS. 4A, 4B), the tongue 314 and the axle grip 340 can be made in the same mold. The disc-like retaining slider 312 is securely attached to the tongue 314. In the same way as for the instant implementation, holes in the axle grip 340 for the axle portions 348a, 348b are pre-configured or drilled after the molding.

Whether on a public beach or private resort, lounging by the backyard swimming pool, or even lying supine on the deck of cruise ship, the versatile personal cooling system affords a convenient, effective, and comfortable tanning experience. Indeed, the personal cooling system is a concept with great potential not only for the sunbather stretched out by the pool, but for the person in a wheelchair, the fisherman in his boat, the cyclist climbing a hill, and even the sports fan enjoying a game at an outdoor stadium, to name just a few.

A mister-fan apparatus 100 includes: a housing 110 having a fan end 114 and a reservoir end 116; at the fan end 114, a fan unit 112; at the reservoir end 116, a reservoir 108; a motor 152; a pump; an inlet conduit 154a from the reservoir 108 to the pump; and an outlet conduit 154b from the pump to the fan unit 112, collectively configured for, through the use of the inlet and outlet conduits 154a, 154b, pumping fluid from the reservoir 108 to the fan unit 112 so that the fan 118 can output mist 136; a track 142 peripherally surrounding the housing 110 at least partway around; an attaching device 220 having an attaching end 218b and an extension end 218a; a tongue 214 having a track end 216a, and a connection end 216b connected to the extension end 218a; and, within the track 142, a retaining slider 204 connected to the track end 216a; wherein the attaching end 218b is configured for removably attaching to an external structure 104 for supporting the apparatus 100. The track 142 may include a pair of ridges 204a, 204b rigidly connected to the housing 110. The ridges 204a, 204b extend initially outwardly from the housing 110, and subsequently toward each other but only to an extent of leaving a separation serving as a slot 206.

It should be noted that the above-mentioned embodiments illustrate rather than limit the invention, and that those skilled in the art will be able to design many alternative embodiments without departing from the scope of the appended claims.

For example, the double-row deep-groove ball bearing 236 can be implemented instead as a single-row deep-groove ball bearing. As another example, a cross-section of the cylindrical housing 110 can be a curve that is not strictly circular. Nor is the path of the tracks 142, 144 necessarily planar. For example, one could draw a "circle" on the side of cylinder. Facing the "circle" to view it, the "circle", though not a planar figure, might appear circular even though that the distance to the viewer varies for different points around what appears to be a circle. Such a track may enclose the disc-like retaining slider 312 which is implementable with either the FIG. 4A or FIG. 5 attaching device 220.

In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements.

What is claimed is:

1. A mister-fan apparatus comprising:
   a housing with a fan end and a reservoir end;
   attached at the fan end, a fan unit that includes a fan;
   attached at the reservoir end, a reservoir for containing fluid;
   a pump assembly that includes a motor, a pump, an inlet conduit from the reservoir to the pump, and an outlet conduit from the pump to the fan unit, wherein the pump assembly is configured for, through the use of the inlet and outlet conduits, pumping fluid from the reservoir to the fan unit so that the fan can output mist;
   a track peripherally surrounding the housing at least partway around;
   an attaching device having an attaching end and an extension end;
   a tongue having a track end, and a connection end connected to the extension end of the attaching device; and
   a retaining slider within the track;
   wherein the retaining slider is connected to the tongue at the track end; and
   wherein said attaching end of the attaching device is configured for removably attaching to an external structure for supporting the mister-fan apparatus.

2. The mister-fan apparatus of claim 1, wherein the track includes a pair of ridges rigidly connected to the housing, wherein the ridges extend initially outwardly from the housing, and subsequently toward each other but only to an extent of leaving a separation serving as a slot.

3. The mister-fan apparatus of claim 2, wherein the retaining slider extends transversally to the slot to restrain, against pulling force exerted by the tongue, the retaining slider from protruding into or exiting through the slot.

4. The mister-fan apparatus of claim 1, wherein the retaining slider is shaped and dimensioned for sliding along the track in adjusting an orientation of the housing with respect to the external structure.

5. The mister-fan apparatus of claim 1, wherein the track is configured such that the retaining slider is slidable along the track over a range of at least 90 degrees in adjusting an orientation of the housing with respect to the external structure.

6. The mister-fan apparatus of claim 1, wherein the housing is cylindrical and axially extends between the fan end and the reservoir end, the track circumferentially following a circular path along and around the cylinder.

7. The mister-fan apparatus of claim 1, wherein the tongue is rigid, the attachment of the fan unit at the fan end is rigid, and the attachment of the reservoir at the reservoir end is rigid.

8. The mister-fan apparatus of claim 1, wherein the tongue is rigidly connected to the retaining slider, and wherein the retaining slider is sized, shaped and sufficiently flexible for manual rotation in place within the track by virtue of manually rotating in place the tongue and thereby the retaining slider.

9. The mister-fan apparatus of claim 1, wherein the attaching device comprises a clamp, wherein the clamp has mutually opposing clamping-jaws designed for gripping by pivoting toward each other, wherein the mutually opposing clamping-jaws are biased to, from a fulcrum, pivot shut at which point the mutually opposing clamping-jaws are closer to each other distally than proximally.

10. The mister-fan apparatus of claim 1, wherein the attaching device comprises a clamp, wherein the clamp has mutually opposing clamping-jaws with an opening therebetween and designed for gripping by pivoting toward each other, and wherein the clamp is designed with a clamping force small enough for both the attaching, and the removing, of the clamp by manual force without need for tools, in accordance with an average strength of nine-year-old boys using the index and middle fingers of both hands.

11. The mister-fan apparatus of claim 1, wherein the attaching device comprises a clamp, wherein the clamp has mutually opposing clamping-jaws designed for gripping by pivoting toward each other, wherein the clamping-jaws have inside surfaces that approach one another as the jaws are clamped shut, and wherein, for grabbing the external structure, discrete pads of frictional material are mounted to the inside surfaces.

12. The mister-fan apparatus of claim 1, wherein the attaching device comprises a clamp, wherein the clamp has mutually opposing clamping-jaws designed for gripping by pivoting toward each other, and wherein the clamping-jaws are disposed and shaped to preserve a proximal separation between the clamping-jaws for manually pulling the clamping-jaws apart in preparation for the removable attaching to the external structure.

13. The mister-fan apparatus of claim 1, wherein the attaching device comprises a clamp, wherein the clamp has mutually opposing clamping-jaws designed for gripping by pivoting toward each other at a fulcrum, wherein said pivoting toward each other is so as to pivot shut, and wherein the clamping-jaws are internally round near the fulcrum in order to circumferentially grab, for support, a cylindrical object.

14. The mister-fan apparatus of claim 1, wherein the attaching device comprises a clamp, and further includes a proximal joint configured so that the clamp is, while the tongue remains motionless, manually rotatable in place, a longitudinal direction of the tongue serving as an axis of rotation of the clamp.

15. The mister-fan apparatus of claim 14, wherein the proximal joint includes a pair of mutually opposing orientation-setting jaws, each mutually opposing orientation-setting jaw of the pair having a set of teeth; and wherein a jaw from among the pair of mutually opposing orientation-setting jaws is rotatable to specific orientations, with respect to the housing, at which the sets, when brought together, interlockingly mate because the teeth of one jaw fill spaces between teeth of the other jaw.

16. The mister-fan apparatus of claim 15, wherein the proximal joint includes a spring for urging the jaws together for the mating into an orientation from among said specific orientations.

17. The mister-fan apparatus of claim 1, wherein the retaining slider is shaped to fit the track so as to be non-rotatable in place.

18. The mister-fan apparatus of claim 1, further comprising a solar panel that is tiltable with respect to the housing.

19. The mister-fan apparatus of claim 1, wherein a friction fit of the retaining slider within the track exists for keeping the mister-fan apparatus rigidly in place at an orientation to which the housing is adjusted with respect to the external structure.

20. The mister-fan apparatus of claim 1, wherein the track serves as an inner track, wherein the mister-fan apparatus further comprises an outer track containing the inner track, and wherein the outer track is rigidly attached to the housing and supports the attaching device.

* * * * *